US009903698B2

(12) United States Patent
Iwatake et al.

(10) Patent No.: US 9,903,698 B2
(45) Date of Patent: Feb. 27, 2018

(54) OBJECT POSTURE CALCULATION SYSTEM

(71) Applicant: FANUC CORPORATION, Yamanashi (JP)

(72) Inventors: Takahiro Iwatake, Yamanashi (JP); Kaimeng Wang, Yamanashi (JP); Bunketsu Chin, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 24 days.

(21) Appl. No.: 15/259,118

(22) Filed: Sep. 8, 2016

(65) Prior Publication Data
US 2017/0067728 A1    Mar. 9, 2017

(30) Foreign Application Priority Data

Sep. 9, 2015   (JP) .................................. 2015-177471

(51) Int. Cl.
G01B 5/004 (2006.01)
G01B 21/04 (2006.01)

(52) U.S. Cl.
CPC ............. *G01B 5/004* (2013.01); *G01B 21/04* (2013.01)

(58) Field of Classification Search
CPC ................................ G01B 5/004; G01B 21/04
USPC .......................................................... 33/503
See application file for complete search history.

(56) References Cited

U.S. PATENT DOCUMENTS

| 6,681,495 B2 * | 1/2004 | Masayuki | B25J 9/1692 33/501 |
| 8,965,581 B2 * | 2/2015 | Nammoto | B25J 9/1612 318/568.12 |
| 9,656,388 B2 * | 5/2017 | Nammoto | B25J 9/1612 |
| 2002/0013675 A1 | 1/2002 | Knoll et al. | |

FOREIGN PATENT DOCUMENTS

| CN | 101314224 A | 12/2008 |
| CN | 102233587 A | 11/2011 |
| CN | 102448683 A | 5/2012 |
| CN | 102581852 A | 7/2012 |
| CN | 103085076 A | 5/2013 |

(Continued)

OTHER PUBLICATIONS

English Machine Translation for Japanese Publication No. 04-043744 B2, published Jul. 17, 1992, 8 pgs.

(Continued)

*Primary Examiner* — Christopher Fulton
(74) *Attorney, Agent, or Firm* — Fredrikson & Byron, P.A.

(57) ABSTRACT

A system which calculates the relative posture or the relative position and posture between a first object and a second object. This invention provides an object posture calculation system including a first object and a second object contactable at three contact points, a driving unit which brings the first object and the second object into contact with each other, a force measuring unit which measures a force acting between the first object and the second object, and an object posture calculation unit which calculates the relative posture or the relative position and posture between the first object and the second object on the basis of the force measured by the force measuring unit when the first object and the second object come into contact with each other at the three contact points.

13 Claims, 17 Drawing Sheets

(56) References Cited

FOREIGN PATENT DOCUMENTS

| CN | 104108104 | A  | 10/2014 |
|----|-----------|----|---------|
| JP | 443744    | B2 | 7/1992  |
| JP | 4348885   | A  | 12/1992 |
| JP | 6143171   | A  | 5/1994  |
| JP | 991026    | A  | 4/1997  |
| JP | 201585499 | A  | 5/2015  |

OTHER PUBLICATIONS

English Abstract and Machine Translation for Japanese Publication No. 09-091026, published Apr. 4, 1997, 10 pgs.
English Abstract and Machine Translation for Japanese Publication No. 2015-085499 A, published May 7, 2015, 17 pgs.
English Abstract and Machine Translation for Japanese Publication No. 06-143171 A, published May 24, 1994, 21 pgs.
English Abstract and Machine Translation for Japanese Publication No. 04-348885 A, published Dec. 3, 1992, 5 pgs.
Untranslated Decision to Grant a Patent mailed by Japan Patent Office (JPO) for Application No. JP 2015-177471, Aug. 9, 2017, 3 pages.
English machine translation of Decision to Grant a Patent mailed by Japan Patent Office (JPO) for Application No. JP 2015-177471, Aug. 9, 2017, 3 pages.
English Abstract and Machine Translation for Chinese Publication No. 104108104 A, published Oct. 22, 2014, 16 pgs.
English Abstract and Machine Translation for Chinese Publication No. 103085076 A, published May 8, 2013, 11 pgs.
English Abstract and Machine Translation for Chinese Publication No. 102581852 A, published Jul. 18, 2012, 7 pgs.
English Abstract and Machine Translation for Chinese Publication No. 102448683 A, published May 9, 2012, 22 pgs.
English Abstract and Machine Translation for Chinese Publication No. 102233587 A, published Nov. 9, 2011, 13 pgs.
English Abstract and Machine Translation for Chinese Publication No. 101314224 A, published Dec. 3, 2008, 8 pgs.

* cited by examiner

OBJECT POSTURE CALCULATION SYSTEM

BACKGROUND OF THE INVENTION

1. Field of the Invention

The present invention relates to an object posture calculation system which calculates the relative posture or the relative position and posture between a first object and a second object on the basis of the force acting between the first object and the second object when the first object and the second object are in contact with each other at three contact points.

2. Description of the Related Art

In calculating the relative posture between a first object and a second object, one commonly-known method measures and calculates the relative posture using a noncontact-type sensor such as a camera or a three-dimensional sensor.

When the system used can control the force acting between a first object and a second object, one generally-known method combines the surface of a predetermined portion of the first object with that of a predetermined portion of the second object or fits the first object with the second object to calculate the relative posture between the first object and the second object from the postures at the start and end of operation.

JP H04-043744 B discloses a method for controlling the position of the first object on the basis of a motion model for a compliance mechanism to adjust the force acting between the first object and the second object to a target value.

When the first object and the second object can be fitted together, such a method can fit the first object and the second object together on the basis of the force acting between the first object and the second object to calculate the relative posture between the first object and the second object from the postures at the start and end of operation.

JP H09-091026 A describes a method for calculating a posture error at the approach point by bringing surfaces into contact with each other by pressing with a predetermined force in a plane perpendicular to a hole portion to combine the surfaces with each other, in advance, to correct the posture error.

With this method, the force acting between the first object and the second object is controlled to combine the surface of the first object with that of the second object to calculate the relative posture between the first object and the second object from the postures of the first object at the start and end of operation. A method for correcting the approach point before the fitting operation on the basis of the calculated relative posture is further disclosed.

When the relative posture between the first object and the second object is measured and calculated using a noncontact-type sensor such as a camera or a three-dimensional sensor, the system may get complicated or cost more. In addition, it may be difficult to calculate the relative posture between the first object and the second object, depending on the states of the first object and the second object, such as the position relationship between the first object and the second object, the conditions of interference with surrounding objects, or the surface shapes of the first object and the second object.

When a system which can control the force acting between the first object and the second object is used to calculate the relative posture between the first object and the second object from the postures at the start and end of operation upon fitting of the first object with the second object, the fitting operation involves much time, thus prolonging the cycle time of the system. In addition, the first object and the second object may be preferably fitted together. The first object may be preferably moved for the fitting operation. Problems such as interference with surrounding objects may be encountered upon movement of the first object during the fitting operation. The relative posture between the first object and the second object may not be calculated unless the first object and the second object normally complete their fitting. It is often difficult to fit the first object and the second object together when the relative posture between the first object and the second object is large.

When a system which can control the force acting between the first object and the second object is used to calculate the relative posture between the first object and the second object from the postures at the start and end of operation upon combining of the surface of the first object with that of the second object, the surface combining operation involves much time, thus prolonging the cycle time of the system. In addition, the first object and the second object may preferably have their surfaces combined with each other. The first object may be preferably moved for the surface combining operation. Problems such as interference with surrounding objects may be encountered upon movement of the first object during the surface combining operation.

SUMMARY OF INVENTION

In view of this, it is an object of the present invention to provide a system which preferably calculates the relative posture or the relative position and posture between a first object and a second object.

In order to achieve the above-described object, the present invention provides an object posture calculation system which calculates a relative posture between a first object and a second object or calculates a relative position and posture between the first object and the second object, the system including the first object and the second object including a combination of an object including a projecting portion and an object including a recessed portion, wherein the projecting portion and the recessed portion are configured to come into contact with each other at three contact points, the three contact points in the recessed portion are located on an edge defining a hole of the recessed portion, and upon defining, as a projecting portion central axis, an axis which is set for the projecting portion and is not perpendicular to a plane including the three contact points, a minimum distance between each of the contact points and the projecting portion central axis takes a constant value or a minimum distance between each of the contact points and the projecting portion central axis is determined on the basis of a distance between a point of intersection of a perpendicular dropped from each of the contact points to the projecting portion central axis with the projecting portion central axis, and a point other than the point of intersection on the projecting portion central axis, at least one driving unit which moves the first object and the second object relative to each other and holds and drives at least one of the first object and the second object, a force measuring unit which measures a force acting between the first object and the second object, and an object posture calculation unit which uses the driving unit to move the first object and the second object relative to each other to bring the first object and the second object into contact with each other, and calculates a relative posture between the first object and the second object or calculates a relative position and posture between the first object and the second object on the basis of the minimum distance and the force measured by the force measuring unit when the first object and the second object come into contact with each other at the three contact points.

In a preferred embodiment, the projecting portion includes at least two projecting portions and the recessed portion includes at least two recessed portions, and the first object includes one of the at least two projecting portions and the at least two recessed portions, the second object includes one of the at least two projecting portions and the at least two recessed portions, or each of the first object and the second object includes one of the at least two projecting portions and the at least two recessed portions.

In a preferred embodiment, at least one object selected from the projecting portion and the recessed portion and included in one of the first object and the second object is removably attached to the one of the first object and the second object including the at least one object.

In a preferred embodiment, before the first object and the second object come into contact with each other at the three contact points, the first object and the second object are moved to a relative approximate position and approximate posture in advance so that the relative position and posture between the first object and the second object fall within a predetermined range of position and posture.

In a preferred embodiment, the force measuring unit further measures a force acting on one of the driving unit, the first object, and the second object, and before the first object and the second object come into contact with each other at the three contact points, the first object and the second object are moved to a relative approximate position and approximate posture in advance so that the relative position and posture between the first object and the second object fall within a predetermined range of position and posture, on the basis of the force measured by the force measuring unit.

In a preferred embodiment, the object posture calculation system further includes an object detection unit configured to detect at least one of a position and a posture of one of the first object and the second object within a predetermined range, wherein before the first object and the second object come into contact with each other at the three contact points, the first object and the second object are moved to a relative approximate position and approximate posture in advance so that the relative position and posture between the first object and the second object fall within a predetermined range of position and posture, on the basis of a detection result obtained by the object detection unit.

In a preferred embodiment, the object posture calculation system further includes a spatial position designation unit including a device which designates one of a position and a position and posture in a space, and a device which recognizes the designated one of the position and the position and posture, wherein before the first object and the second object come into contact with each other at the three contact points, the first object and the second object are moved to a relative approximate position and approximate posture in advance so that the relative position and posture between the first object and the second object fall within a predetermined range of position and posture, on the basis of the one of the position and the position and posture designated by the spatial position designation unit.

In a preferred embodiment, at least one of a position and a posture of one of the first object and the second object with respect to the driving unit is calculated on the basis of one of the relative posture and the relative position and posture between the first object and the second object calculated by the object posture calculation unit.

In a preferred embodiment, one of a position, a posture, and a position and posture to which one of the first object, the second object, and the first object and the second object to be moved by the driving unit is moved is corrected on the basis of one of the relative posture and the relative position and posture between the first object and the second object calculated by the object posture calculation unit.

In a preferred embodiment, at least one type of determination among quality determination of one of the first object and the second object, type determination of one of the first object and the second object, and determination of a holding state in which one of the first object and the second object is held by the driving unit is performed on the basis of one of the relative posture and the relative position and posture between the first object and the second object calculated by the object posture calculation unit.

In a preferred embodiment, the projecting portion and the recessed portion are configured to be fitted together in a combination of the projecting portion and the recessed portion in the first object and the second object, the driving unit moves the first object and the second object relative to each other, holds and moves at least one of the first object and the second object, and is configured to perform movement to fit the first object and the second object together, the object posture calculation system further includes a fitting unit which uses the driving unit to move the first object and the second object relative to each other to perform force control to fit the first object and the second object together, on the basis of the force measured by the force measuring unit, and the fitting unit fits the first object and the second object together on the basis of one of the relative posture and the relative position and posture between the first object and the second object calculated by the object posture calculation unit.

The fitting unit may fit the first object and the second object together after movement to correct one of the relative posture and the relative position and posture between the first object and the second object, on the basis of one of the relative posture and the relative position and posture between the first object and the second object calculated by the object posture calculation unit.

Further, the fitting unit may fit the first object and the second object together by performing force control based on the force measured by the force measuring unit to increase a velocity of movement for reducing the relative posture between the first object and the second object when the relative posture between the first object and the second object is large, on the basis of one of the relative posture and the relative position and posture between the first object and the second object calculated by the object posture calculation unit.

DETAILED DESCRIPTION

Figure 1:
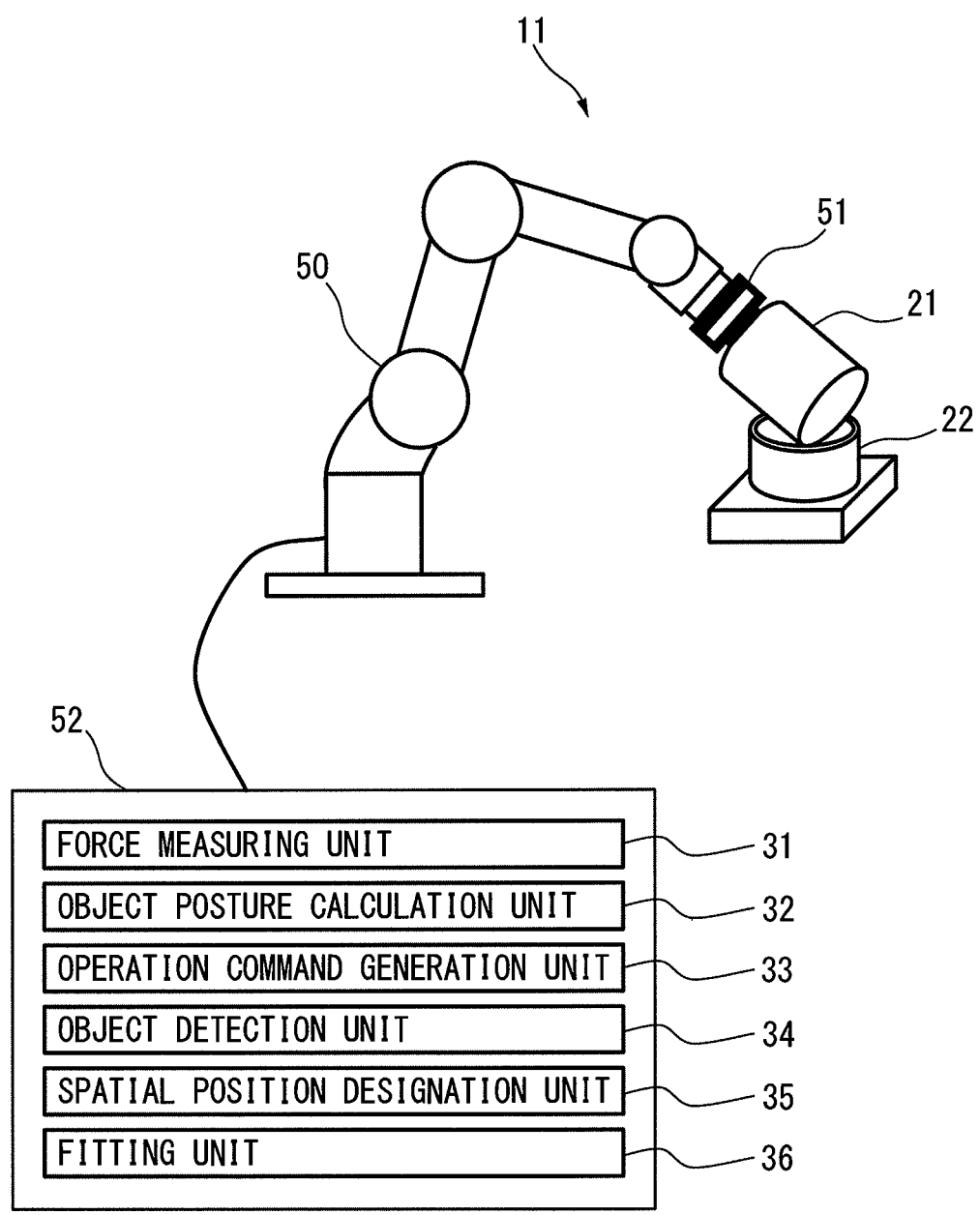
FIG. 1 is a view illustrating the schematic configuration of a system according to a first embodiment of the present invention.

Embodiments of the present invention will be described below with reference to the accompanying drawings. In the following drawings, the same reference numerals denote the same members. For the sake of easy understanding, these drawings use different scales as appropriate.

In the present invention, the "force" includes force translational components and force moment components, unless otherwise noted. Further, "A and/or B" refers to including at least one of A and B and, for example, the "position and/or posture" refers to including at least one of the position and the posture.

In this embodiment, a coordinate system set for a space can represent the position and/or posture of the distal end portion of a driving unit or an object held at the distal end portion of the driving unit (this state includes the attached state), in an orthogonal coordinate system fixed with respect to a space. The distal end portion of the driving unit means a portion in the driving unit which can hold and move an object. A tool coordinate system is set for the distal end portion of a driving unit or an object held at the distal end portion of the driving unit, and can represent the position and/or posture of the distal end portion of a driving unit or an object held at the distal end portion of the driving unit, in a coordinate system set for a pedestal supporting the driving unit or a reference coordinate system set for a space. A control point represents the position of the distal end portion of a driving unit or an object held at this distal end portion. A force control coordinate system is set with a control point as its origin to control the position and/or posture of an object held at the distal end portion of a driving unit, on the basis of the force acting between one (a first) object and the other (a second) object. A force measuring coordinate system for posture calculation is set to calculate the relative posture or the relative position and posture between a first object and a second object by an object posture calculation unit on the basis of the force acting between the first object and the second object. Transformation into a force in a certain coordinate system means representing a certain force in a certain coordinate system as a force acting on the origin of the certain coordinate system.

In the description of this embodiment, in mathematical expressions, "·" represents multiplication of a matrix and a vector, "×" represents the exterior product, "*" represents multiplication, "/" represents division, "Cos(x)" represents a cosine function, "Sin(x)" represents a sine function, "Arccos (x)" represents an inverse trigonometric function of a cosine function, "Arcsin(x)" represents an inverse trigonometric function of a sine function, "Arctan(x)" represents an inverse trigonometric function of a tangent function, and "≈" represents approximation of the left-hand side to the right-hand side. P(Point b_Coordinate System a) represents the position of point b in coordinate system a. (Vector A)^T represents the transposed vector of vector A.

An object posture calculation system calculates the relative posture between a first object and a second object. FIG. 1 is a schematic view illustrating an exemplary configuration of an object posture calculation system 11 according to a first embodiment of the present invention. The object posture calculation system 11 includes a first object 21, a second object 22, a driving unit 50 which moves the first object 21 as a driving unit which holds and moves at least one of the first object 21 and the second object 22, a force measuring unit 31 which measures a force acting between the first object 21 and the second object 22, and an object posture calculation unit 32 which calculates the relative posture between the first object 21 and the second object 22.

The object posture calculation system 11 further includes a driving unit controller 52. The driving unit controller 52 includes not only an operation command generation unit 33 which generates an operation command for the driving unit 50 but also the force measuring unit 31 and the object posture calculation unit 32. Although the force measuring unit 31 and the object posture calculation unit 32 are provided in the driving unit controller 52 in this embodiment, they may be included in, e.g., a central controller, another controller, or an arithmetic processor connected to the driving unit controller 52.

The driving unit 50 includes one or more axes, each of which is controlled for each predetermined control cycle by the driving unit controller 52 so that the distal end portion of the driving unit 50 may be positioned at a designated location. The driving unit controller 52 has a hardware configuration including, e.g., a CPU, a ROM, and a RAM and further includes, e.g., a storage unit, a display output unit, an input unit, and a signal output unit which outputs various signals (none are illustrated) to execute various functions (to be described later).

Figure 2:
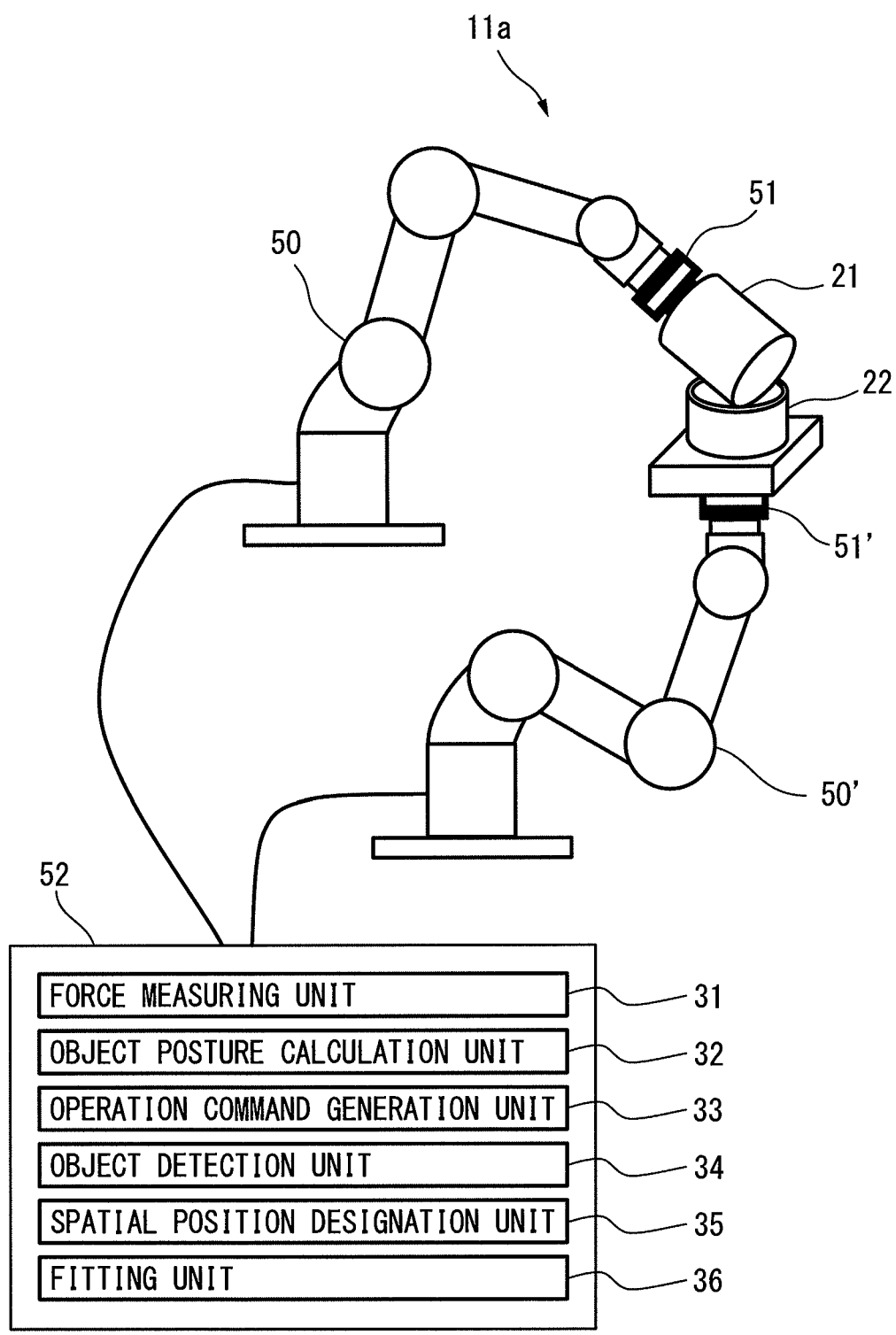
FIG. 2 is a view illustrating the schematic configuration of a system according to another first embodiment of the present invention.

Each of the driving unit 50 depicted as FIG. 1 and a driving unit 50' depicted as FIG. 2 is implemented in a vertical multi-articulated robot which uses six axes, but they are similarly applicable to any known robots having other modes and known driving devices including moving mechanisms as long as they can translate, rotate, or translate and rotate the first object 21 and the second object 22 relative to each other. When the second object 22 moves, the first object 21 may be moved on the basis of the position and posture of the second object 22.

The operation command generation unit 33 generates and outputs an operation command for each control axis of the driving unit 50 to allow the driving unit 50 to smoothly move to a desired position and/or posture. The operation command generation unit 33 may further adjust the operation command by performing filtering processing to prevent a rapid increase in jerk or anti-vibration processing for reducing vibration upon the operation of the driving unit 50, or correcting the command position and/or posture in consideration of, e.g., flexure of the driving unit 50 to achieve accurate movement to a target position. As illustrated as FIG. 2, when the driving unit controller 52 moves the driving units 50 and 50', the driving unit controller 52 generates and outputs an operation command for each control axis of the driving unit 50' to allow the driving unit 50' to smoothly move to a desired position and/or posture, as in the driving unit 50.

FIG. 2 is a schematic view illustrating an exemplary configuration of an object posture calculation system 11a according to another first embodiment of the present invention. The object posture calculation system 11a includes a first object 21, a second object 22, a driving unit 50 which holds and moves the first object 21 and a driving unit 50' which holds and moves the second object 22 as driving units, each of which holds and moves at least one of the first object 21 and the second object 22, a force measuring unit 31, and an object posture calculation unit 32. A six-axis force sensor 51' is attached to the distal end portion of the driving unit 50'.

Like the object posture calculation system 11a, the object posture calculation system 11 may further include a driving unit 50' which moves the second object 22. In this manner, the object posture calculation system may include two driving units to enable independent movement of the first object and the second object. Each control axis of the driving unit 50' is controlled and moved by the driving unit controller 52. As an additional feature to the driving unit controller 52 in the object posture calculation system 11, a driving unit controller 52 in the object posture calculation system 11a uses an operation command generation unit 33 to generate an operation command for the driving unit 50'. The force measuring unit 31 may measure a force acting between the first object 21 and the second object 22, on the basis of the force acting on the portion of the driving unit 50' where the second object 22 is held. A driving unit controller which moves the driving unit 50' may even be provided independently of the driving unit controller 52.

When the driving unit 50' illustrated as FIG. 2 is used to bring the first object 21 and the second object 22 into contact with each other, the second object 22 may be moved by the driving unit 50' in consideration of, e.g., the range and direction in which the driving unit 50 is movable, and the states of peripheral devices so that the driving unit 50 can easily bring the projecting portion of the first object 21 and the recessed portion of the second object 22 into contact with each other by allowing the driving unit 50 to move free from, e.g., interference and to involve only translation or rotation. Further, when the driving unit 50' moves the second object 22, the driving unit 50 is preferably moved in consideration of the amount of movement. A force acting between the first object 21 and the second object 22 may even be measured by the force measuring unit 31 on the basis of the output from the force sensor 51' mounted at the distal end portion of the driving unit 50'.

An embodiment of the present invention will be described below with reference to the object posture calculation system 11 according to the embodiment of the present invention depicted as FIG. 1.

The object posture calculation system 11 uses the driving unit 50 to move the first object 21 and the second object 22 relative to each other to bring the first object 21 and the second object 22 into contact with each other, and uses the object posture calculation unit 32 to calculate the relative posture or the relative position and posture between the first object 21 and the second object 22 on the basis of the output from the force measuring unit 31 that measures a force acting between the first object 21 and the second object 22 when the first object 21 and the second object 22 into contact with each other at three contact points.

The first object 21 and the second object 22 are a combination of an object including a projecting portion and an object including a recessed portion, with the projecting portion and the recessed portion capable of coming into contact with each other at three contact points. In other words, when the first object 21 includes a projecting portion, the second object 22 includes at least one recessed portion which can come into contact with the projecting portion at three contact points. When the first object 21 includes a recessed portion, the second object 22 includes at least one projecting portion which can come into contact with the recessed portion at three contact points. The three contact points in the recessed portion are located on the edge defining the hole of the recessed portion. Upon defining, as a projecting portion central axis, an axis which is set for the projecting portion and is not perpendicular to the plane including the three contact points, the minimum distance between each of the contact points and the projecting portion central axis takes a predetermined value (constant value) or the minimum distance between each of the contact points and the projecting portion central axis is determined on the basis of the distance between a point of intersection of a perpendicular dropped from each of the contact points to the projecting portion central axis with the projecting portion central axis, and a predetermined point (a point other than the point of intersection) on the projecting portion central axis.

Figure 3A:
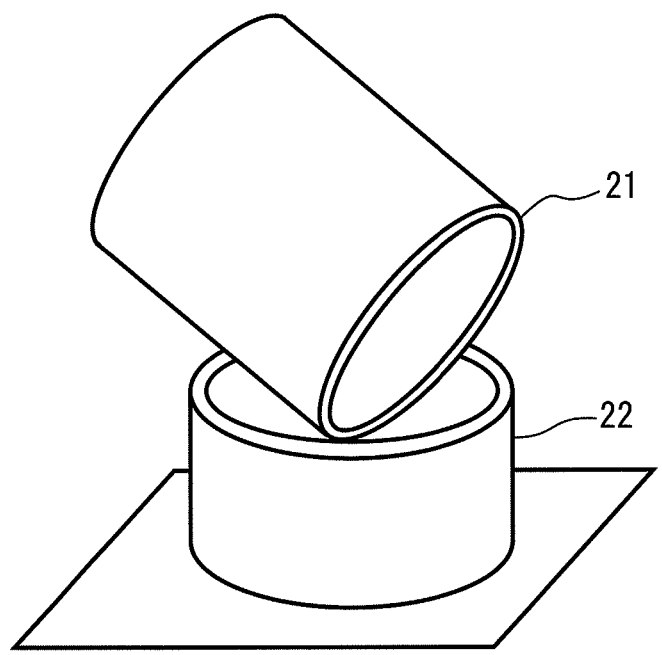
FIGS. 3a and 3b are views illustrating the modes in which a first object and a second object come into contact with each other at three contact points.
Figure 3B:
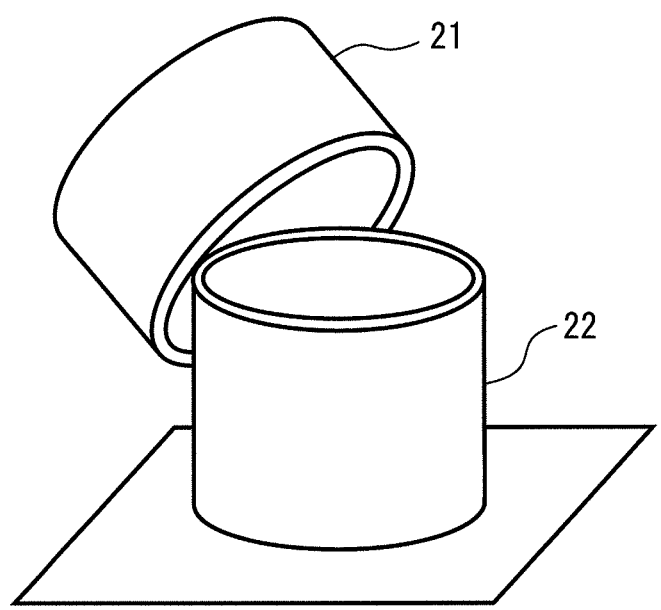

FIGS. 3a and 3b illustrate the modes in which projecting and recessed portions included in the first object 21 and the second object 22 come into contact with each other at three contact points. FIG. 3a illustrates the mode in which the outer portion of a hollow cylinder included in the first object 21 is used as a projecting portion, and the inner portion of a hollow cylinder included in the second object 22 is used as a recessed portion to bring the projecting portion of the first object 21 and the recessed portion of the second object 22 into contact with each other at three contact points. FIG. 3b illustrates the mode in which the inner portion of a hollow cylinder included in the first object 21 is used as a recessed portion, and the outer portion of a hollow cylinder included in the second object 22 is used as a projecting portion to bring the recessed portion of the first object 21 and the projecting portion of the second object 22 into contact with each other at three contact points. In this manner, the projecting portion of the first object 21 may be brought into contact with the recessed portion of the second object 22 at three contact points or the recessed portion of the first object 21 may be brought into contact with the projecting portion of the second object 22 at three contact points. When hollow cylinders having approximately the same size are used, they may serve both as a projecting portion and as a recessed portion. As described above, when objects having appropriate sizes and inner spaces, like hollow cylinders, are used, they may serve both as a projecting portion and as a recessed portion. The projecting portion of the first object 21 may form a hollow cylinder to be contacted having a diameter larger or smaller than that of the recessed portion of the second object 22, as illustrated as FIG. 3*a*. The recessed portion included in the first object 21 may form a hollow cylinder to be contacted having a diameter larger or smaller than that of the projecting portion included in the second object 22, as illustrated as FIG. 3*b*.

Figure 4:
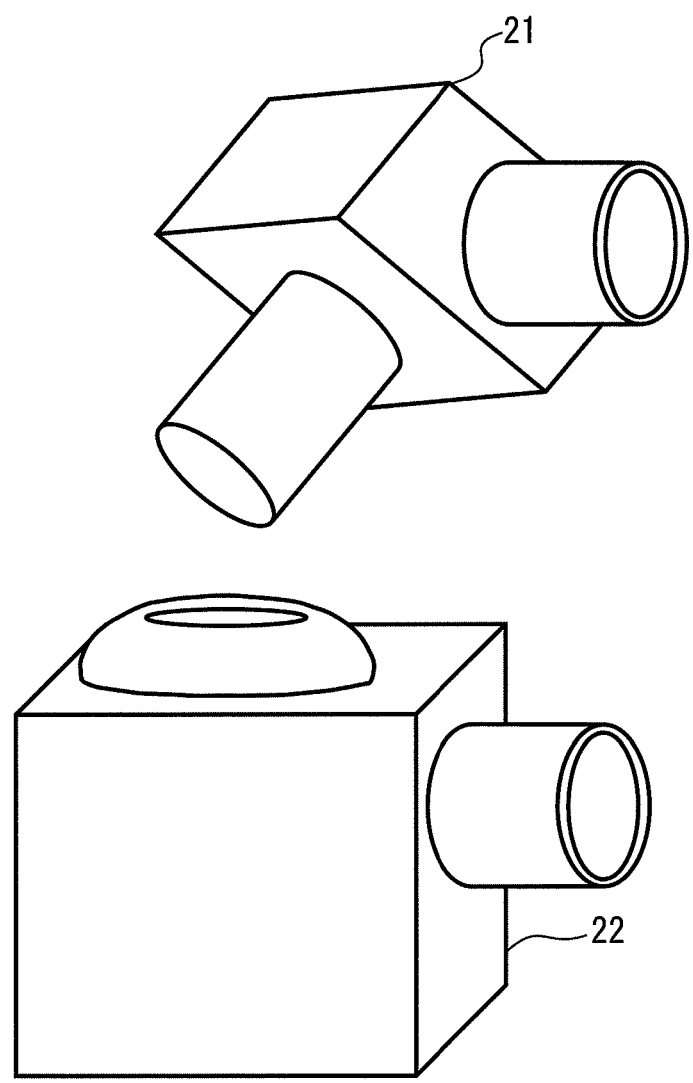
FIG. 4 is a view illustrating the mode in which the first object and the second object include projecting and recessed portions.

FIG. 4 illustrates the mode in which the first object 21 and the second object 22 include projecting and recessed portions. Each of the first object 21 and the second object 22 includes at least one set of projecting and recessed portions, and the recessed portion of the first object 21 and the projecting portion of the second object 22 or the projecting portion of the first object 21 and the recessed portion of the second object 22 can come into contact with each other at three contact points. The first object 21 and the second object 22 may include pluralities of projecting portions and recessed portions having different sizes or shapes.

FIGS. 5*a* to 5*h* illustrate exemplary shapes of a projecting portion 23 included in at least one of the first object 21 and the second object 22. The projecting portion 23 may form a solid cylinder, as illustrated as FIG. 5*a*, form an object having a partially cut circular cross-section, as illustrated as FIG. 5*b*, or form an object having a circular cross-section including a cut wider than that of the cross-section illustrated as FIG. 5*b*, as illustrated as FIG. 5*c*. Alternatively, the projecting portion 23 may form an object having a circular cross-section including three cuts, as illustrated as FIG. 5*d*, or form an object having a circular cross-section including two cuts within the range defined by a predetermined position and a solid cylindrical shape in its portion other than the predetermined position, as illustrated as FIG. 5*e*. The projecting portion 23 may even form an object including an inner space occupied by no object, like a hollow cylindrical object, as illustrated as FIG. 5*f*, or form an object whose diameter varies depending on the distance from the end, like a tapered body, as illustrated as FIGS. 5*g* and 5*h*. When a tapered body is used, its diameter may linearly increase or decrease, as illustrated as FIG. 5*g*, or nonlinearly increase or decrease in the form of, e.g., an exponential or quadratic function, as illustrated as FIG. 5*h*. When the object illustrated as FIG. 5*a*, 5*f*, 5*g*, or 5*h* is used, an axis about which the projecting portion 23 is symmetrical can be defined as a projecting portion central axis. When the object illustrated as FIG. 5*b*, 5*c*, 5*d*, or 5*e* is used, the central axis of a solid cylinder minimally including the projecting portion 23 can be defined as a projecting portion central axis.

Figure 6A:
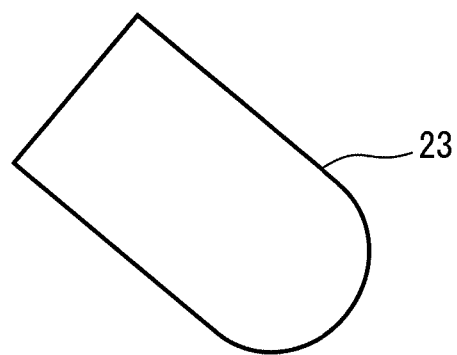
FIGS. 6a and 6b are views illustrating exemplary cross-sectional shapes of the projecting portion included in at least one of the first object and the second object.
Figure 6B:
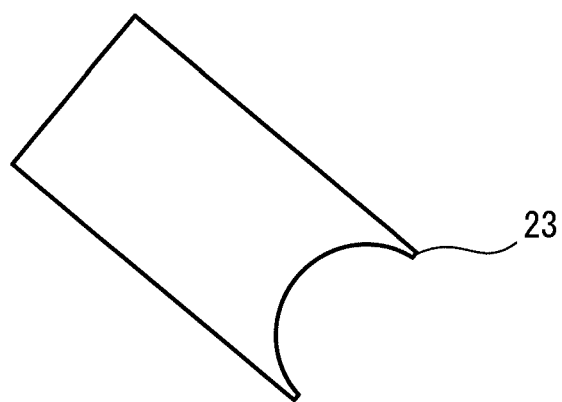
Figure 7A:
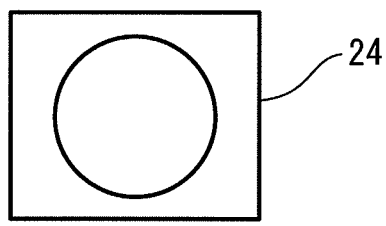
FIGS. 7a to 7d are views illustrating exemplary shapes of the recessed portion included in at least one of the first object and the second object.
Figure 7B:
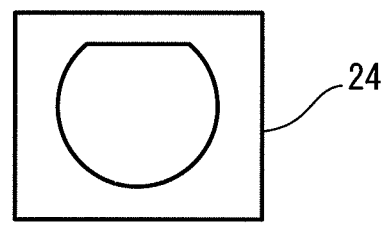
Figure 7C:
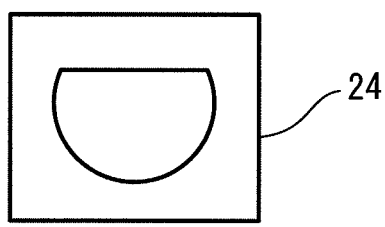
Figure 7D:
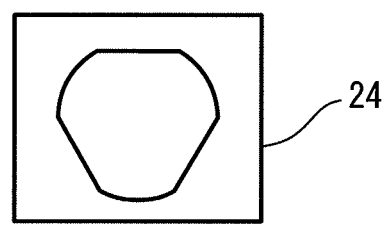

FIGS. 6*a* and 6*b* illustrate exemplary cross-sectional shapes of the projecting portion 23 included in at least one of the first object 21 and the second object 22 taken along a projecting portion central axis set for the projecting portion 23. When viewed in a cross-sectional perspective taken along a projecting portion central axis set for the projecting portion 23, the projecting portion 23 may form an object having a convex shape, such as a hemispherical shape, at its distal end portion and a solid cylindrical shape in its remainder, as in the cross-sectional shape illustrated as FIG. 6*a*. In this case, since the distal end portion of the projecting portion has a convex shape such as a hemispherical shape, the projecting portion 23 may not have its surface combined with a plane located on, e.g., the edge defining the recessed portion in the second object 22, and the relative posture between the projecting and recessed portions therefore may not be calculated by combining the surface of the projecting portion 23 with a plane included in the second object 22. When viewed in a cross-sectional perspective taken along a projecting portion central axis set for the projecting portion 23, the projecting portion 23 may form an object having a concave shape, such as a hemispherical recess, at its distal end portion and a solid cylindrical shape in its remainder, as in the cross-sectional shape illustrated as FIG. 6*b*.

As described above, the projecting portion included in at least one of the first object 21 and the second object 22 may have a circular cross-section or a cross-section including a fragment of a circle at its distal end portion such that the cross-sectional shape is continuous within the range defined by a predetermined position and includes a portion of the projecting portion forming a solid cylinder in its area outside the predetermined position. The projecting portion included in at least one of the first object 21 and the second object 22 may also be hollow or tapered. The projecting portion included in at least one of the first object 21 and the second object 22 may even form an object having a convex or concave shape at its distal end portion. Thus, the projecting portion included in at least one of the first object 21 and the second object 22 may have any shape except for the portions where the projecting and recessed portions come into contact with each other at three contact points, as long as the above-mentioned conditions are satisfied.

FIGS. 7*a* to 7*d* illustrate exemplary shapes of the edge defining the hole of a recessed portion 24 included in at least one of the first object 21 and the second object 22. The recessed portion 24 may form an object having a circular edge defining the hole of the recessed portion, as illustrated as FIG. 7*a*, or form an object having a partially cut circular edge defining the hole of the recessed portion, as illustrated as FIG. 7*b*. The recessed portion 24 may even form an object having a circular edge defining the hole of the recessed portion and including a cut wider than that of the edge defining the hole of the recessed portion illustrated as FIG. 7*b*, as illustrated as FIG. 7*c*, or form an object having a circular edge defining the hole of the recessed portion and including three cuts, as illustrated as FIG. 7*d*.

Figure 8A:
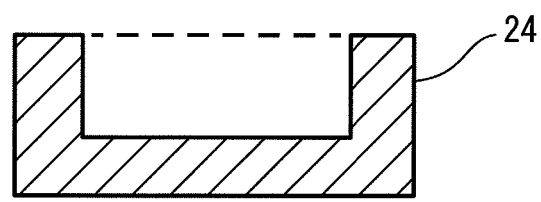
FIGS. 8a and 8b are views illustrating exemplary cross-sectional shapes of the recessed portion included in at least one of the first object and the second object.
Figure 8B:
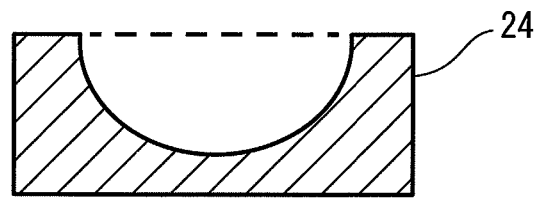

FIGS. 8*a* and 8*b* illustrate exemplary cross-sectional shapes of the recessed portion 24 included in at least one of the first object 21 and the second object 22 taken in the central axis direction of the hole of the recessed portion. The recessed portion 24 may form an object having a continuous structure conforming to the shape of the edge defining the hole of the recessed portion within the range defined by a predetermined position, as illustrated as FIG. 8*a*, or form an object whose cross-sectional shape in a plane perpendicular to the central axis of the hole of the recessed portion 24 varies in the central axis direction of the hole of the recessed portion 24, such as an object having a hemispherical recess, as illustrated as FIG. 8*b*.

As described above, the recessed portion included in at least one of the first object 21 and the second object 22 may form a recess having a circular shape, a shape including a fragment of a circle, or the like on the edge defining the hole of the recessed portion. The recessed portion included in at least one of the first object 21 and the second object 22 may not form an object having a continuous structure conforming to the shape of the edge defining the hole of the recessed portion by, e.g., varying the cross-sectional shape of the recessed portion in a plane perpendicular to the central axis of the hole of the recessed portion, in the central axis direction of the hole of the recessed portion. The recessed portion included in at least one of the first object 21 and the second object 22 may even form, e.g., a body whose configuration surrounding the hole of the recessed portion varies in the central axis direction of the hole of the recessed portion, such as a hemispherical convex object including the hole of the recessed portion. In this manner, the recessed portion included in at least one of the first object 21 and the second object 22 may have any shape except for the portions where the projecting and recessed portions come into contact with each other at three contact points, as long as the above-mentioned conditions are satisfied.

Figure 9A:
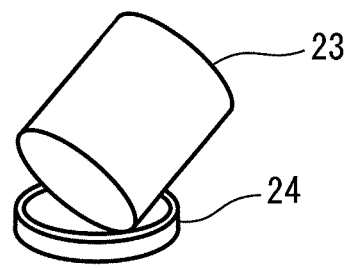
FIGS. 9a to 9d are views illustrating exemplary combinations of projecting and recessed portions in the first object and the second object.
Figure 9B:
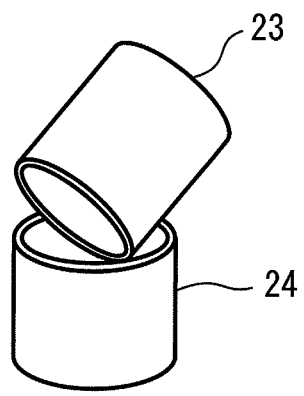
Figure 9C:
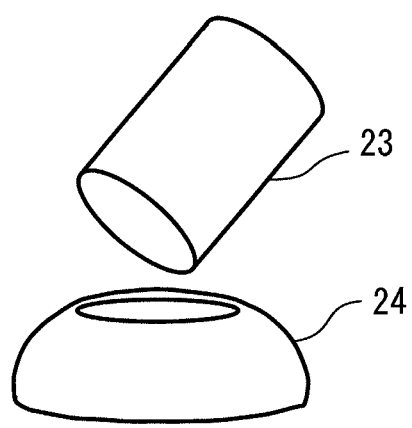
Figure 9D:
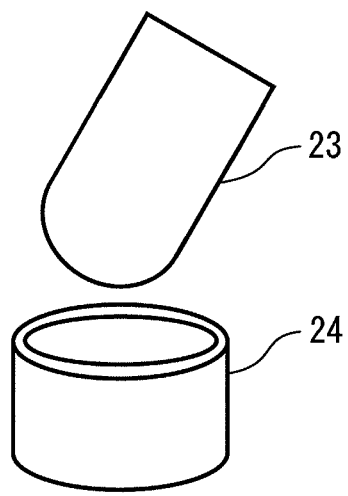

FIGS. 9a to 9d are views illustrating exemplary combinations of the projecting portion 23 included in at least one of the first object 21 and the second object 22 and the recessed portion 24 included in at least one of the first object 21 and the second object 22 different from the former object, as mentioned earlier. FIG. 9a illustrates a projecting portion 23 forming a solid cylinder and a recessed portion 24 forming a hollow cylinder. FIG. 9b illustrates a projecting portion 23 and a recessed portion 24 both forming hollow cylinders. FIG. 9c illustrates a projecting portion 24 forming a solid cylinder and a recessed portion 24 forming a convex object, such as a hemisphere, including the hole of the recessed portion. FIG. 9d illustrates a projecting portion 23 forming a solid cylinder including a convex object, such as a hemisphere, at its end and a recessed portion 24 forming a hollow cylinder.

At least one of a part forming the projecting portion included in at least one of the first object 21 and the second object 22 and a part forming the recessed portion included in at least one of the first object 21 and the second object 22 may form an object removably attached to the object including either portion. In other words, a part forming the projecting or recessed portion included in the first object 21 may be an object removably attached to the first object 21. A part forming the projecting or recessed portion included in the second object 22 may be an object removably attached to the second object 22.

The driving unit includes at least one mechanism unit which moves an object, is configured to move the first object 21 and the second object 22 relative to each other, and holds and moves at least one of the first object 21 and the second object 22. In this embodiment, holding an object by the driving unit means operations for making an object ready to be moved by the driving unit, such as gripping of an object by the driving unit or placement or attachment of an object on the driving unit. The driving unit 50 may be used to move the first object 21 while the driving unit 50' is used to move the second object 22, as described with reference to FIG. 2. In this manner, the first object 21 and the second object 22 may be moved relative to each other by at least one driving unit as mentioned earlier. The driving unit may include a mechanism unit equipped with any moving mechanism as long as the first object 21 and the second object 22 can be moved relative to each other and brought into contact with each other at three contact points by translation, rotation, or translation and rotation. The distal end portion of the driving unit 50 where the first object 21 is held, illustrated as FIG. 1, is equipped with a force sensor 51 for detecting a force acting on the distal end portion of the driving unit 50.

The force sensor 51 serves as a detector which detects a force acting between the first object 21 and the second object 22. The force sensor 51 can further detect a force acting on the distal end portion of the driving unit 50. The driving unit controller 52 uses the force measuring unit 31 to measure a force acting between the first object 21 and the second object 22, on the basis of the output from the force sensor 51 detected for each predetermined time. Although the force sensor 51 serves as a six-axis force sensor in this embodiment, any force sensor may be used as long as it has degrees of freedom preferably used for operation. The force sensor 51 may be attached to any portion, such as the distal end portion of the driving unit 50, each control shaft of the driving unit 50, the portion supporting the driving unit 50, the portion supporting the second object 22, or the distal end portion of the driving unit 50' illustrated as FIG. 2, as long as it can detect a force acting between the first object 21 and the second object 22. Although the force measuring unit 31 measures a force acting between the first object 21 and the second object 22 on the basis of the output from the force sensor 51 in this embodiment, a force acting between the first object 21 and the second object 22 may be measured by detecting other types of physical information, instead of using the force sensor 51.

The force measuring unit 31 measures a force acting between the first object 21 and the second object 22 on the basis of the force data detected by the force sensor 51. The force measuring unit 31 may not use the force sensor 51 attached to the distal end portion of the driving unit 50 in order to measure a force acting between the first object 21 and the second object 22, and, in this case, when an actuator which moves axes constituting the driving unit 50 serves as a motor, a force acting between the first object 21 and the second object 22 may be measured by estimating and calculating it on the basis of, e.g., the current value, the deviations between the command positions of control axes constituting the driving unit 50 and their actual positions, or the output from a torque sensor attached to each control shaft of the driving unit 50.

The force measuring unit 31 may further measure forces acting on the driving unit 50, the first object 21, and the second object 22. In this case, when an actuator which moves the force sensor 51 attached to the driving unit 50 or axes constituting the driving unit 50 serves as a motor, forces acting on the driving unit 50 (including, e.g., a mechanism unit constituting the driving unit 50 and the distal end portion of the driving unit 50) and an object held and moved by the driving unit 50 are measured on the basis of, e.g., the current value, the deviations between the command positions of control axes constituting the driving unit 50 and their actual positions, or the output from a torque sensor attached to each control shaft of the driving unit 50. The second object 22 that is not moved by the driving unit 50 may be measured using a force sensor located under the second object 22 or in the same way as in the driving unit 50 when the other driving unit 50' holds the second object 22.

The object posture calculation unit 32 uses the driving unit 50 to move the first object 21 and the second object 22 relative to each other to bring the first object 21 and the second object 22 into contact with each other and calculates the relative posture between the first object 21 and the second object 22 or the relative position and posture between the first object 21 and the second object 22 on the basis of the force measured by the force measuring unit 31 when the first object 21 and the second object 22 come into contact with each other at three contact points, and the minimum distance between each contact point and the projecting portion central axis.

An embodiment of a method for calculating the relative posture or the relative position and posture between the first object 21 and the second object 22 will be described below with reference to FIGS. 10a to 17.

Figure 10A:
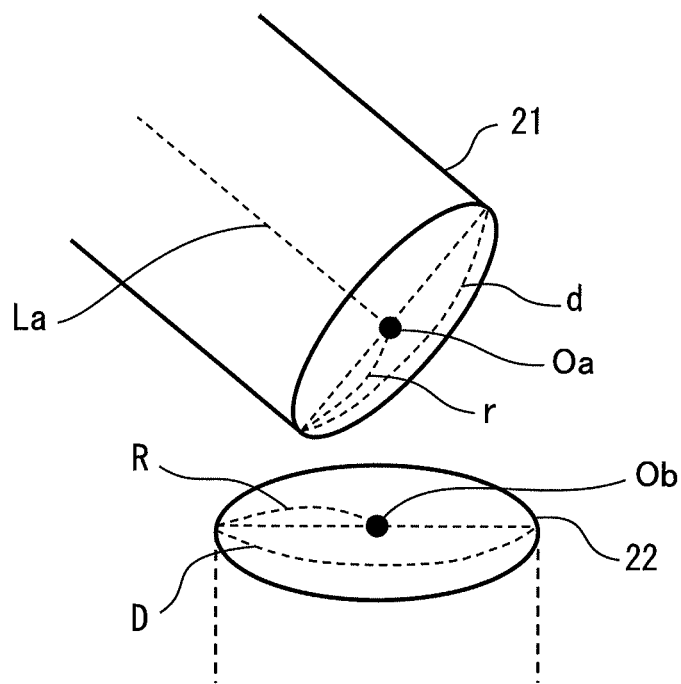
FIGS. 10a and 10b are views illustrating the modes in which the first object and the second object have come into contact with each other at three contact points.
Figure 10B:
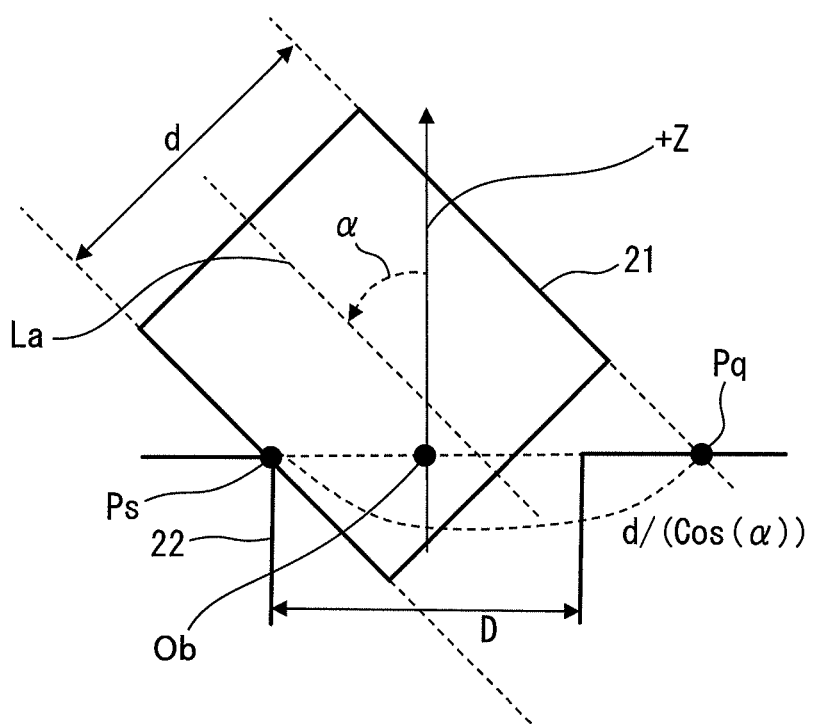

FIG. 10*a* illustrates information concerning, e.g., the shapes of the first object 21 and the second object 22. FIG. 10*b* illustrates the state in which the projecting portion of the first object 21 and the recessed portion of the second object 22 are in contact with each other at three contact points, as viewed in a cross-section taken along a plane which is perpendicular to the plane including the three contact points and includes the projecting portion central axis of the first object 21.

Figure 11C:
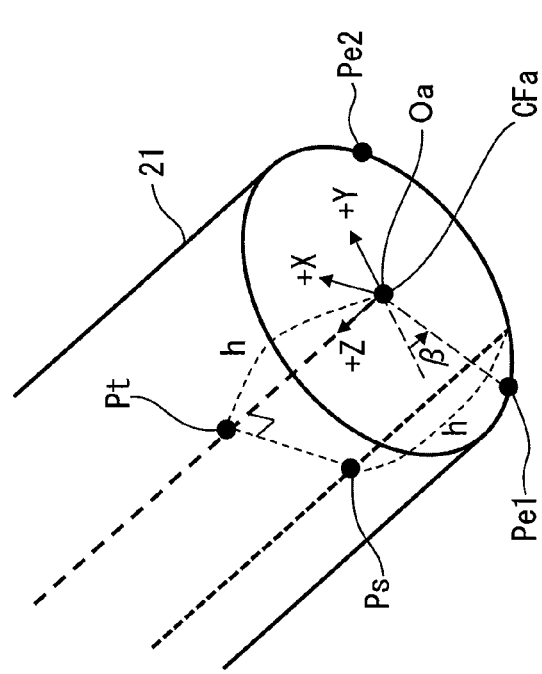
FIGS. 11a to 11c are views illustrating the modes in which the first object and the second object have come into contact with each other at three contact points.
Figure 11A:
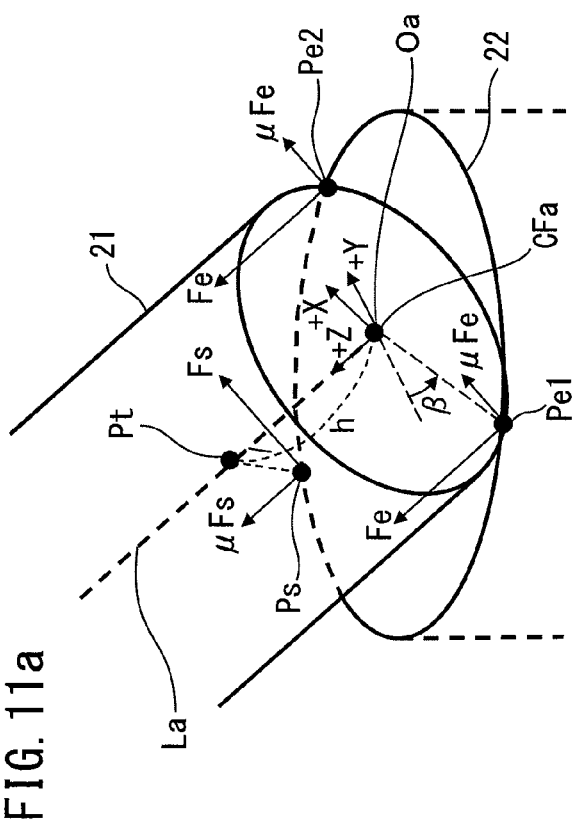
Figure 11B:
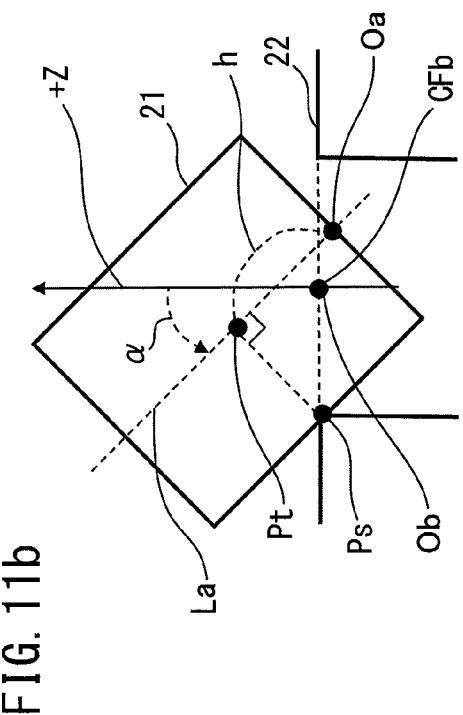

FIGS. 11*a* to 11*c* illustrate the state in which the first object 21 and the second object 22 are in contact with each other at three contact points. FIG. 11*a* illustrates the state in which the projecting portion of the first object 21 and the recessed portion of the second object 22 are in contact with each other at three contact points. FIG. 11*b* illustrates the state in which the projecting portion of the first object 21 and the recessed portion of the second object 22 are in contact with each other at three contact points, as viewed in a cross-section taken along a plane which is perpendicular to the plane including the three contact points and includes the projecting portion central axis of the first object 21. FIG. 11*c* theoretically illustrates the projecting portion of the first object 21 and the recessed portion of the second object 22 as separated for the sake of explaining parameters but, in practice, the projecting portion of the first object 21 and the recessed portion of the second object 22 are in contact with each other at three contact points.

Figure 12A:
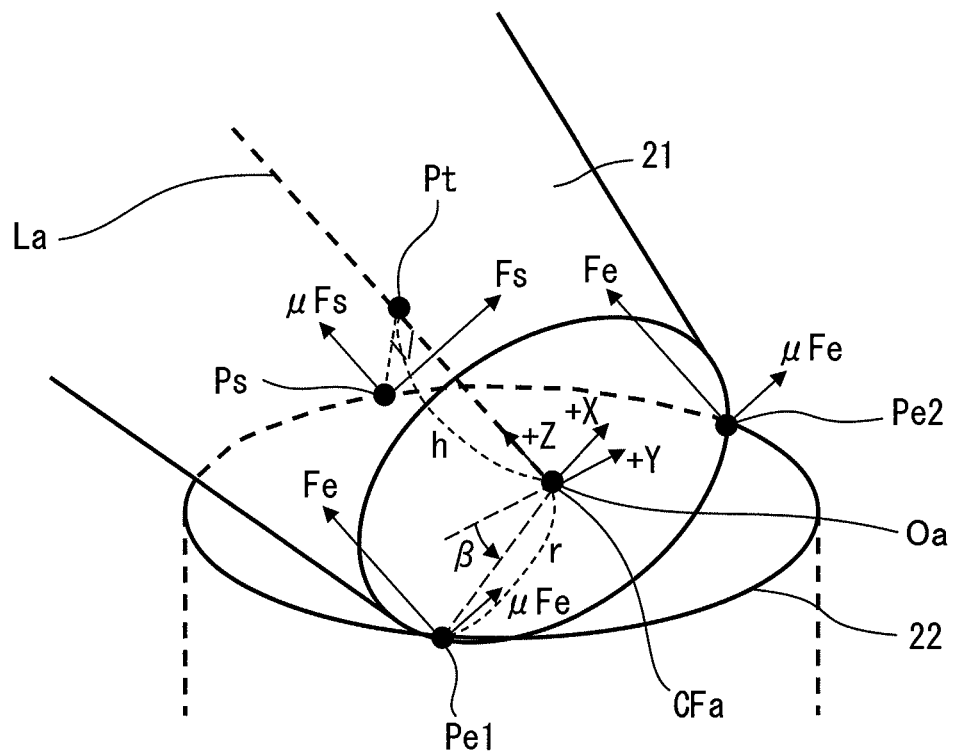
FIGS. 12a and 12b are views illustrating the modes in which the first object and the second object have come into contact with each other at three contact points.
Figure 12B:
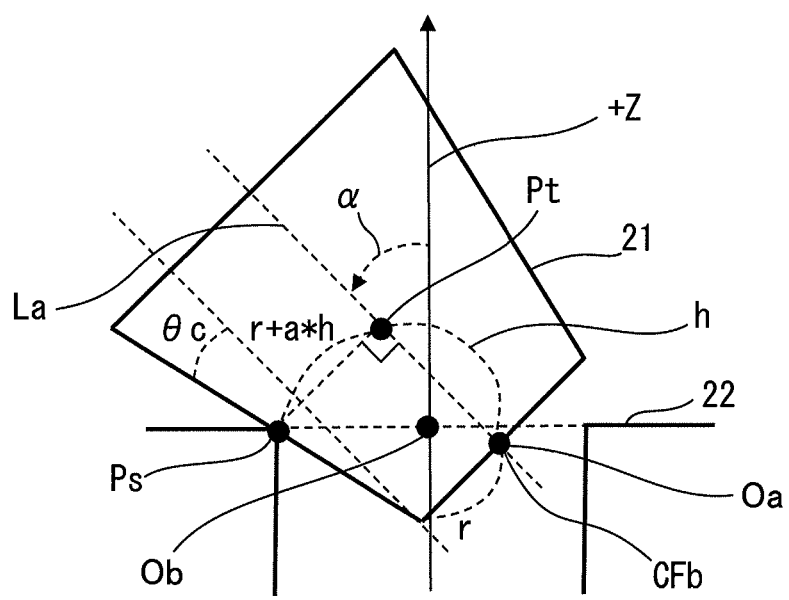

FIG. 12*a* illustrates the state in which the projecting portion of the first object 21 and the recessed portion of the second object 22 are in contact with each other at three contact points. FIG. 12*b* illustrates the state in which the projecting portion of the first object 21 and the recessed portion of the second object 22 are in contact with each other at three contact points, as viewed in a cross-section taken along a plane which is perpendicular to the plane including the three contact points and includes the projecting portion central axis of the first object 21.

Figure 13A:
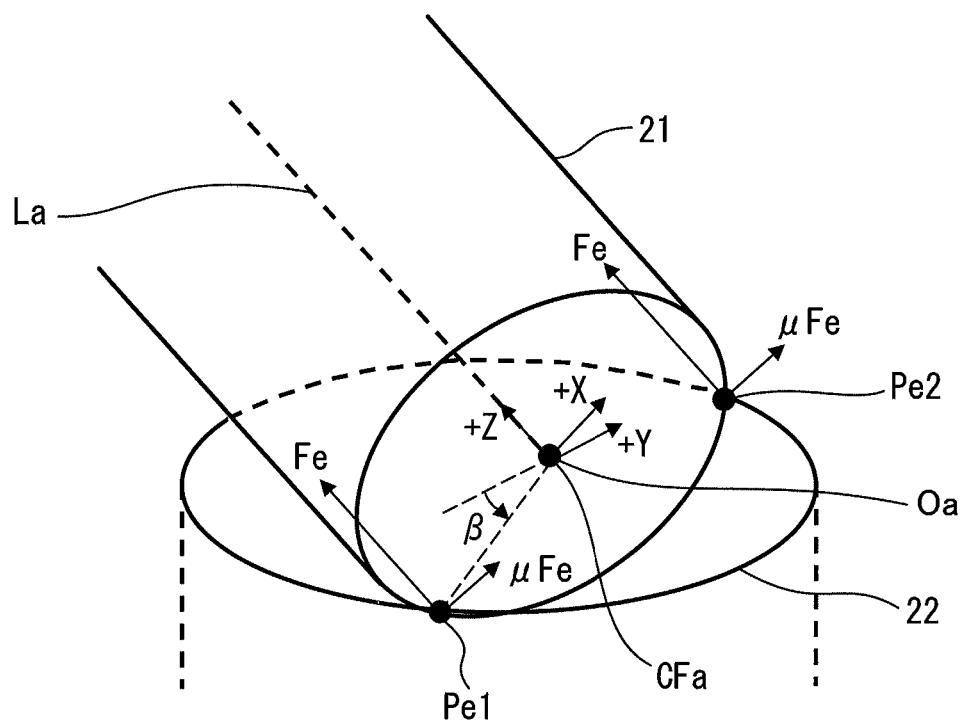
FIGS. 13a and 13b are views illustrating the modes in which the first object and the second object have come into contact with each other at two contact points.
Figure 13B:
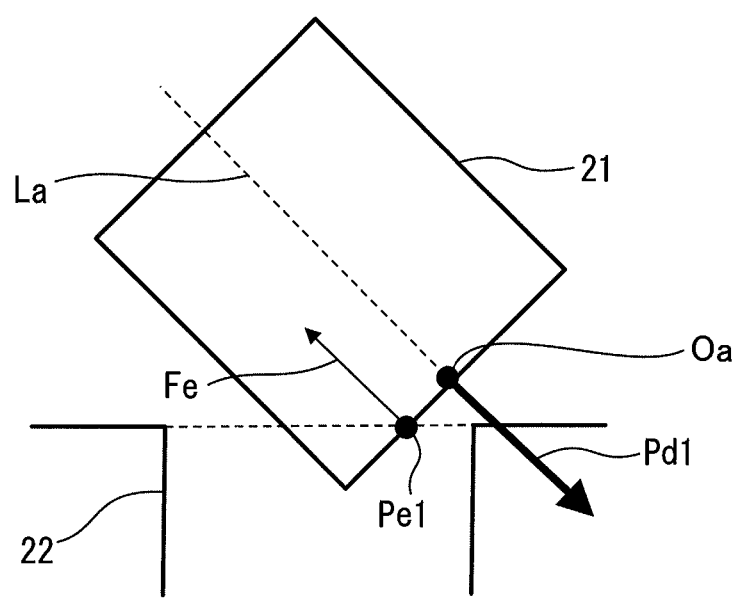
Figure 14A:
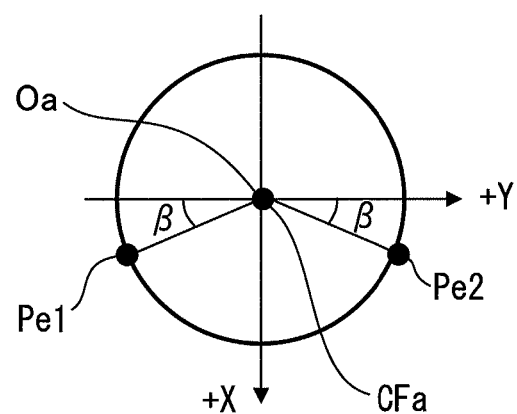
FIGS. 14a and 14b are views illustrating exemplary settings of a force measuring coordinate system for posture calculation.
Figure 14B:
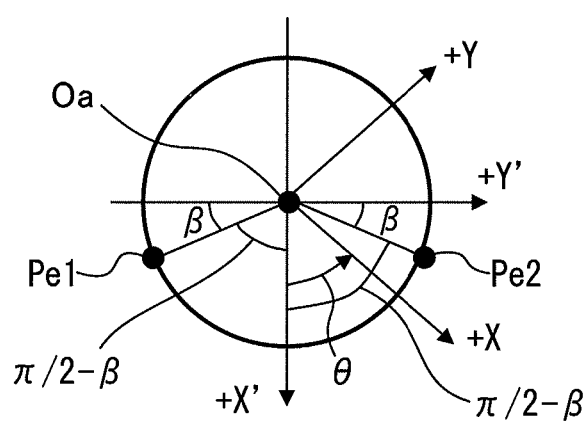

FIGS. 13*a* and 13*b* illustrate the state in which the first object 21 and the second object 22 are in contact with each other at two contact points. FIGS. 14*a* and 14*b* illustrate setting of a force measuring coordinate system for posture calculation set for the first object 21.

Figure 15A:
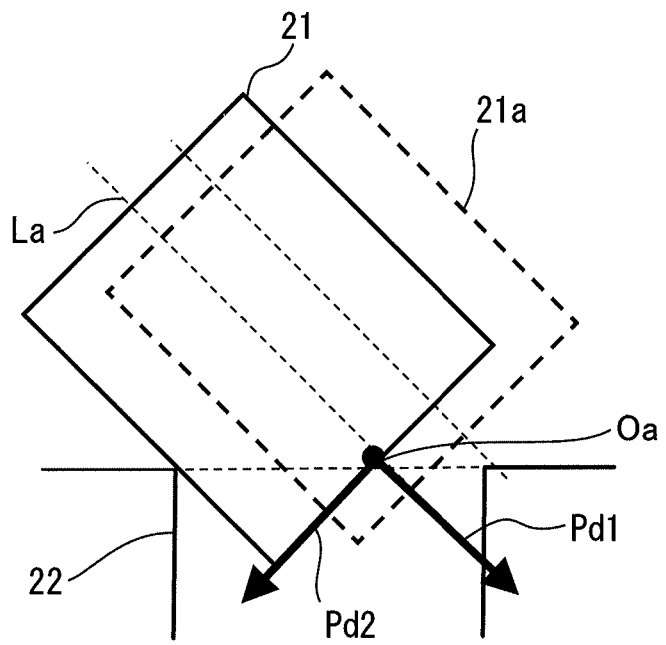
FIGS. 15a and 15b are views illustrating exemplary operations for bringing the first object and the second object into contact with each other at three contact points.
Figure 15B:
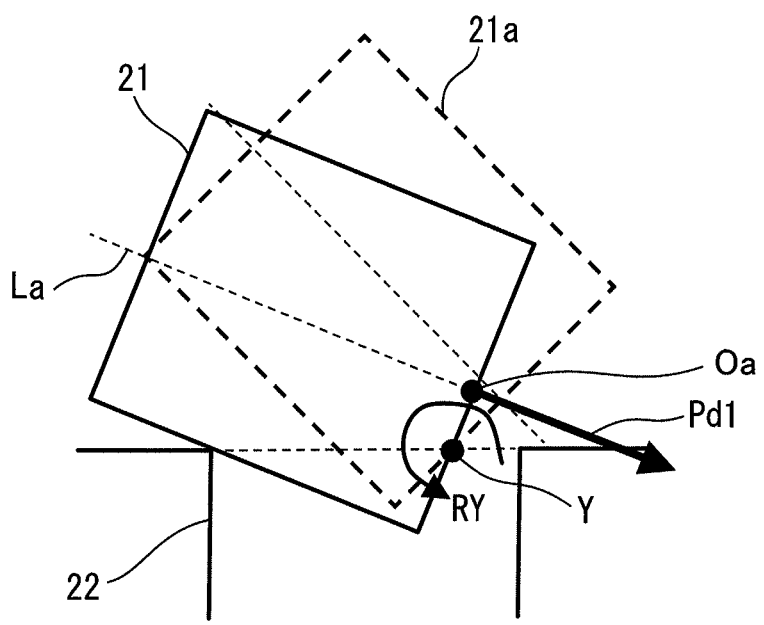
Figure 16A:
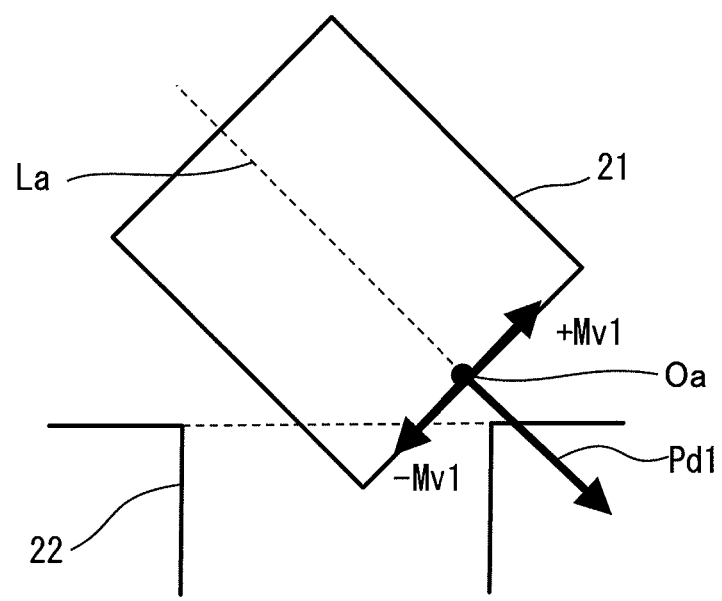
FIGS. 16a and 16b are views illustrating another exemplary setting of a force measuring coordinate system for posture calculation.
Figure 16B:
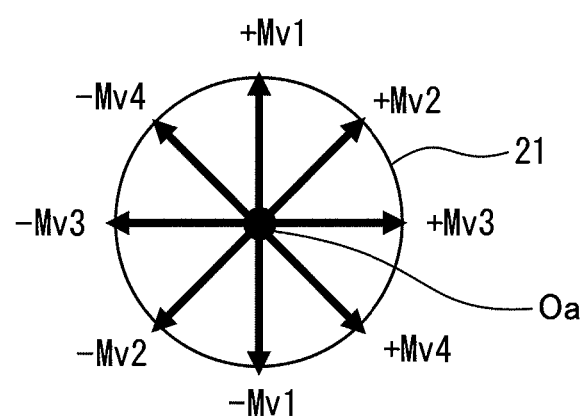
Figure 17:
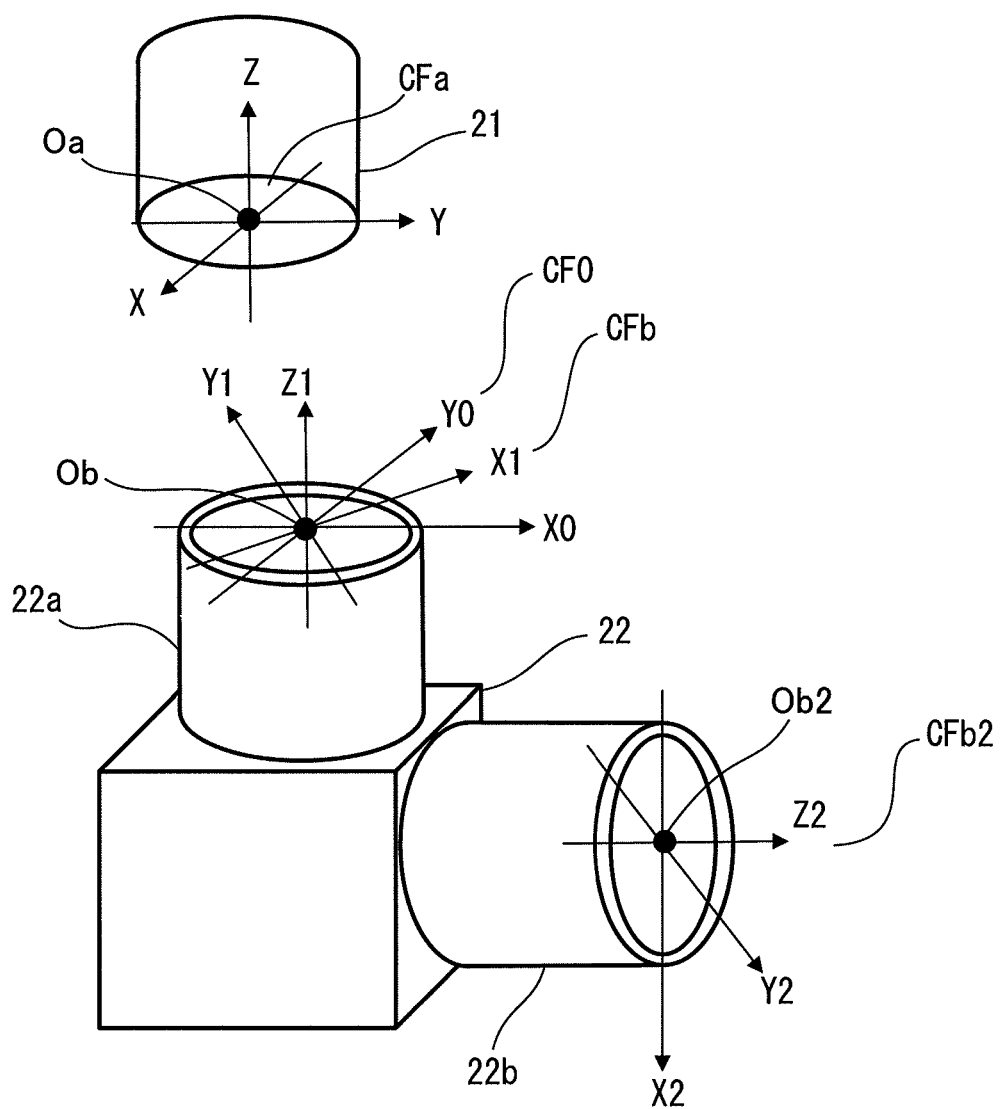
FIG. 17 is a view illustrating the shape of a second object including a plurality of recessed portions.
Figure 18A:
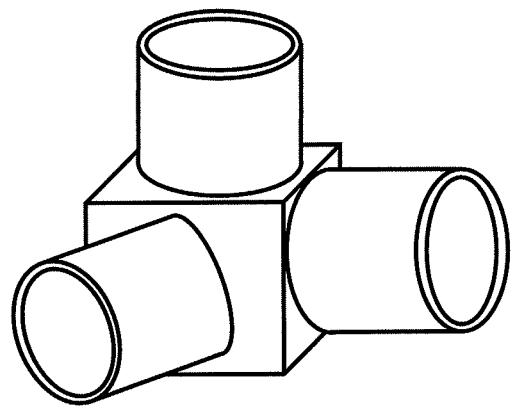
FIGS. 18a to 18d are views illustrating shapes including pluralities of projecting portions and recessed portions included in the first object and the second object.
Figure 18B:
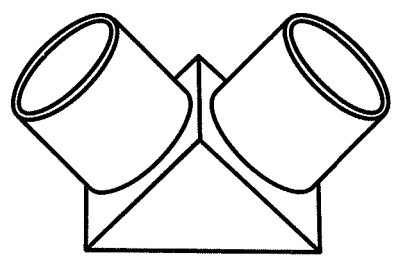
Figure 18C:
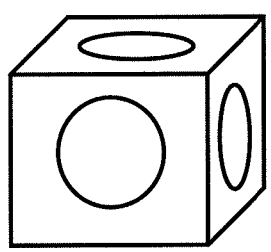
Figure 18D:
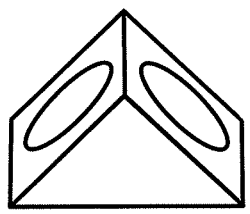

FIGS. 15*a* and 15*b* illustrate operations for bringing the first object 21 and the second object 22 into contact with each other at three contact points. FIGS. 16*a* and 16*b* illustrate setting of a force measuring coordinate system for posture calculation set for the first object 21. FIG. 17 is a view for explaining calculation of the position and posture of the second object 22 relative to the first object 21, using a plurality of recessed portions included in the second object 22.

For the sake of simplicity, this embodiment assumes that a projecting portion is included in the first object 21 and forms a solid cylinder, as depicted as FIG. 10*a*. A recessed portion is included in the second object 22 and forms a hole which can be fitted with the solid cylinder formed by the projecting portion. The projecting portion of the first object 21 and the recessed portion of the second object 22 form objects which can come into contact with each other at three contact points, as described earlier, when the relative posture is equal to or larger than a predetermined value.

The radius of the solid cylinder formed by the projecting portion of the first object 21 is represented as r and its diameter is represented as d, as illustrated as FIG. 10*a*. The radius of the hole of the recessed portion of the second object 22 is represented as R and its diameter is represented as D. The solid cylinder formed by the projecting portion of the first object 21 has a predetermined length in the central axis direction of the solid cylinder so that the projecting and recessed portions can come into contact with each other at three contact points, as described earlier. The central point of the end portion of the solid cylinder formed by the projecting portion of the first object 21 is represented as a point Oa. A projecting portion central axis La is set to the central axis of the solid cylinder as an axis set for the projecting portion of the first object 21. The projecting portion of the first object 21 is symmetrical about the projecting portion central axis La. The central point of the end portion defining the hole of the recessed portion of the second object 22 is represented as a point Ob.

FIG. 11*a* illustrates the state in which the projecting portion of the first object 21 and the recessed portion of the second object 22 are in contact with each other at three contact points, as described earlier. As illustrated as FIG. 11*a*, when the projecting portion of the first object 21 and the recessed portion of the second object 22 come into contact with each other at three contact points, the projecting portion central axis La set for the projecting portion is not perpendicular to the plane including the three contact points. The three contact points in the recessed portion of the second object 22 are located on the edge defining the hole of the recessed portion. The minimum distance between each of the three contact points and the projecting portion central axis takes a predetermined value (constant value) or the minimum distance between each contact point and the projecting portion central axis is determined on the basis of the distance between a point of intersection of a perpendicular dropped from each of the three contact points to the projecting portion central axis with the projecting portion central axis, and a predetermined point (a point other than the point of intersection and, in this case, the point Oa) on the projecting portion central axis (note, however, that for a solid cylindrical projecting portion, this minimum distance takes a constant value even when the distance between the point of intersection and the point other than the point of intersection is different).

When the projecting portion of the first object 21 and the recessed portion of the second object 22 are in contact with each other at three contact points, as described earlier, the three points are defined as points Pe1, Pe2, and Ps. The three contact points Pe1, Pe2, and Ps are located on the edge defining the hole of the recessed portion of the second object 22 on the side of the first object 21 and located on the circumference of a circle having the point Ob as its center. The three contact points are located on the projecting portion of the first object 21 as two points Pe1 and Pe2 on the circumference of a circle on the edge of the distal end portion of the solid cylinder on the side of the second object 22, and one point Ps on the side surface of the solid cylinder. The minimum distance between the projecting portion central axis La and each of the three points of contact of the projecting portion of the first object 21 with the second object 22 is equal to r.

The radius r and the diameter d of the solid cylinder formed by the projecting portion of the first object 21 and the radius R and the diameter D of the hole of the recessed portion of the second object 22 are known, but they may be calculated in advance for either the first object 21 or the second object 22. For example, assuming that the first object 21 is tilted with respect to another object such as a wall, a base, or another workpiece and pressed in the Z-axis direction toward the other object in a tool coordinate system having the projecting portion central axis La of the first object 21 as its Z-axis, calculation may be performed on the basis of the force in the Z-axis direction, and the forces about other axes. Alternatively, the diameter of the first object 21 may be calculated on the basis of the position at which the first object 21 comes into contact with another object such as a wall, a base, or another workpiece. For example, first, the circular edge of the projecting portion of the first object 21 is brought into contact with another fixed object. The projecting portion of the first object 21 is then rotated through a predetermined angle about the projecting portion central axis La to bring the circular edge of the projecting portion of the first object 21 into contact with the other fixed object. In doing this, the projecting portion of the first object 21 is made contact by rotation through 180° about the projecting portion central axis La, or, for example, a contact operation and position detection are performed at least three times at an appropriate angle to obtain a radius r and a diameter d in the projecting portion of the first object 21. The radius R and the diameter D of the hole of the recessed portion of the second object 22 are calculated to be nearly equal to the radius r and the diameter d in the projecting portion of the first object 21. The radius R and the diameter D of the hole of the recessed portion of the second object 22 may be calculated in advance by setting a TCP (Tool Center Point), a control point, and a tool coordinate system for a pin attached to the driving unit 50 and using the pin.

The driving unit 50 holds and moves the first object 21. In this case, the point Oa is preset for the projecting portion of the first object 21 as a control point to set a tool coordinate system having the control point as its origin. A tool coordinate system is thus set to determine the position and posture of the projecting portion of the first object 21 with respect to the driving unit 50. A tool coordinate system is defined by orthogonal X-, Y-, and Z-axes. The Z-axis is set to coincide with the projecting portion central axis, and the positive direction includes a component in the direction away from the recessed portion of the second object 22. The positive and negative directions of the X- and Y-axes may be set in appropriate directions for the first object 21.

As illustrated as FIG. 11b, when the projecting portion of the first object 21 and the recessed portion of the second object 22 come into contact with each other at three contact points, as described earlier, the angle that a normal to the plane including the three contact points makes with the projecting portion central axis La set for the projecting portion of the first object 21 is defined as an angle α. The angle α is formed between the positive direction of the Z-axis of a coordinate system CFb set for the hole of the recessed portion of the second object 22 and the positive direction of the Z-axis of a force measuring coordinate system CFa for posture calculation set for the projecting portion of the first object 21, as will be described later.

The relationships between the diameter d of the solid cylinder formed by the projecting portion of the first object 21, the diameter D of the hole of the recessed portion of the second object 22, and the angle α when the projecting portion of the first object 21 and the recessed portion of the second object 22 come into contact with each other at three contact points will be considered hereinafter.

FIG. 10b illustrates the state in which the projecting portion of the first object 21 and the recessed portion of the second object 22 are in contact with each other at three contact points, as viewed in a cross-section taken along a plane which is perpendicular to the plane including the three contact points and includes the projecting portion central axis La of the first object 21.

As illustrated as FIG. 10b, when the projecting portion of the first object 21 and the recessed portion of the second object 22 come into contact with each other at three contact points, the projecting portion of the first object 21 is projected in the direction along the projecting portion central axis La onto the plane including the three contact points and, in this case, a plane including the edge defining the hole of the recessed portion of the second object 22. The intersection of the portion projected onto the plane including the three contact points and a plane which is perpendicular to the plane including the three contact points and includes the projecting portion central axis La serves as a line connecting the point Ps and an endpoint Pq defined as the ends of intersection to each other.

The length of the line connecting the point Ps and the endpoint Pq together is represented as $d/(\cos(\alpha))$. When the projecting portion of the first object 21 and the recessed portion of the second object 22 come into contact with each other at three contact points, the length of the line connecting the point Ps and the endpoint Pq together is equal to or larger than D and satisfies:

$$d/(\cos(\alpha)) \geq D \qquad (1)$$

where D>d holds.

From expression (1), we have expression (2):

$$\alpha \geq \mathrm{Arccos}(d/D) \qquad (2)$$

Expression (2) reveals that as the diameter d of the solid cylinder formed by the projecting portion of the first object 21 comes closer to the diameter D of the hole of the recessed portion of the second object 22, the value of the angle α reduces so that contact is made at three contact points even with a small relative posture. Expression (2) further reveals that when, for example, the projecting portion has a diameter of (30−0.005) mm and the recessed portion has a diameter of (30+0.005) mm, the projecting and recessed portions come into contact with each other at three contact points at an angle α of about 1.48° (inclusive) to about 90° (exclusive). It is even revealed that when the projecting portion has a diameter of (50−0.005) mm and the recessed portion has a diameter of (50+0.005) mm, the projecting and recessed portions come into contact with each other at three contact points at an angle α of about 1.15° (inclusive) to about 90° (exclusive).

When the projecting and recessed portions are fitted together and the relative posture between the projecting and recessed portions has a large deviation, it is generally difficult to perform fitting by force control based on the force acting between the projecting portion of the first object 21 and the recessed portion of the second object 22 or fitting within a predetermined time. In such a case, in accordance with the present invention, the relative posture or the relative position and posture between the projecting portion of the first object 21 and the recessed portion of the second object 22 are calculated and used to, e.g., move the projecting portion of the first object 21 and the recessed portion of the second object 22 to a position relationship corrected by the calculated relative posture and then perform fitting by force control, thus making it easy to fit the projecting portion of the first object 21 and the recessed portion of the second object 22 together with as few failures as possible or in as short a time as possible.

A force measuring coordinate system for posture calculation is used to calculate the relative posture or the relative position and posture between the first object 21 and the second object 22 on the basis of the force measured by the force measuring unit 31 when the first object 21 and the second object 22 come into contact with each other at three contact points, and the minimum distance between each contact point and the projecting portion central axis. The relative posture or the relative position and posture between the first object 21 and the second object 22 are calculated on the basis of a force obtained by transforming the force acting between the first object 21 and the second object 22 into that in the force measuring coordinate system for posture calculation. A force measuring coordinate system for posture calculation set for the projecting portion of the first object 21 is defined as a coordinate system CFa, as illustrated as FIGS. 11a and 11c. When the relative position and posture between the projecting portion of the first object 21 and the recessed portion of the second object 22 fall within a certain range or the first object 21 and the second object 22 are in contact with each other, they are pressed against each other with a predetermined target force in a direction including the negative direction of the Z-axis of the force measuring coordinate system CFa for posture calculation set for the projecting portion of the first object 21, and passive force control is performed to adjust the target force to zero in two orthogonal directions perpendicular to the Z-axis to move the projecting portion of the first object 21, so that the projecting portion of the first object 21 and the recessed portion of the second object 22 can come into contact with each other at two or three contact points. The following description assumes that the projecting portion of the first object 21 and the recessed portion of the second object 22 are pressed against each other with a predetermined target force in a direction including the negative direction of the Z-axis of the force measuring coordinate system CFa for posture calculation, and passive force control is performed to adjust the target force to zero in two orthogonal directions perpendicular to the Z-axis to move the projecting portion of the first object 21, so that the projecting portion of the first object 21 and the recessed portion of the second object 22 can come into contact with each other at two or three contact points.

A method for setting a force measuring coordinate system CFa for posture calculation will be described below. When a force measuring coordinate system CFa for posture calculation is set in the following way, the setting of a force measuring coordinate system CFa for posture calculation is complete. First, a force measuring coordinate system CFa for posture calculation is defined by orthogonal X-, Y-, and Z-axes. The origin of the coordinate system is set on the projecting portion central axis to coincide with the central point Oa of the circle formed by the projecting portion of the first object 21. The X-, Y-, and Z-axes of the force measuring coordinate system CFa for posture calculation are set to satisfy the following conditions when the projecting portion of the first object 21 and the recessed portion of the second object 22 come into contact with each other. The Z-axis is set to coincide with the projecting portion central axis, and the positive direction includes a component in the direction away from the recessed portion of the second object 22. The Y-axis is set parallel to a line connecting the above-mentioned contact points Pe1 and Pe2 together when the projecting portion of the first object 21 and the recessed portion of the second object 22 come into contact with each other at three contact points. The positive direction of the X-axis includes a component in the direction away from the recessed portion of the second object 22.

The setting of a force measuring coordinate system CFa for posture calculation is completed in the following way.

First, the origin of a coordinate system defined by orthogonal X-, Y-, and Z-axes is set to the central point Oa of the circle formed by the projecting portion of the first object 21. The Z-axis is set to coincide with the projecting portion central axis (in this case, the central axis of the solid cylinder), and the positive direction is set to include a component in the direction away from the recessed portion of the second object 22. The direction of rotation about the Z-axis is subsequently determined for the X- and Y-axes. As long as the X- or Y-axis is determined, the direction of the other axis is also determined.

The projecting portion of the first object 21 is moved relative to the recessed portion of the second object 22 in the direction in which the projecting portion of the first object 21 and the recessed portion of the second object 22 come into contact with each other, such as the negative direction of the Z-axis of the force measuring coordinate system CFa for posture calculation, the negative direction of the Z-axis of a tool coordinate system set for the first object 21, or the direction toward the recessed portion of the second object 22 in a coordinate system set for a space. After the projecting portion of the first object 21 and the recessed portion of the second object 22 come into contact with each other, they are pressed against each other with a predetermined target force in the negative direction of the Z-axis of the force measuring coordinate system CFa for posture calculation, and passive force control is performed to adjust the target force to zero in two orthogonal directions perpendicular to the Z-axis to move the projecting portion of the first object 21, so that the projecting portion of the first object 21 and the recessed portion of the second object 22 come into contact with each other at two or three contact points. In this case, when the first object 21 comes to rest, it is determined that the projecting portion of the first object 21 and the recessed portion of the second object 22 have come into contact with each other at two or three contact points.

The projecting portion of the first object 21 is thus moved to bring the projecting portion of the first object 21 and the recessed portion of the second object 22 into contact with each other at two points Pe1 and Pe2 in this case, as illustrated as FIGS. 13a and 13b, but the same applies when the projecting portion of the first object 21 and the recessed portion of the second object 22 come into contact with each other at three contact points. FIG. 13b illustrates the state in which the projecting portion of the first object 21 and the recessed portion of the second object 22 come into contact with each other at two contact points, as illustrated as FIG. 13a, as viewed in a cross-section which is perpendicular to the edge defining the hole of the recessed portion of the second object 22 and includes the projecting portion central axis La. A force Fe acting on the contact point Pe1 is projected onto the cross-section. As illustrated as FIG. 13b, while the projecting portion of the first object 21 and the recessed portion of the second object 22 are in contact with each other at two contact points, the projecting portion of the first object 21 is pressed against the recessed portion of the second object 22 with a predetermined target force in a pressing direction Pd1 defined as the negative direction of the Z-axis of the force measuring coordinate system CFa for posture calculation, and passive force control is performed to adjust the target force to zero in two orthogonal directions perpendicular to the Z-axis to move the projecting portion of the first object 21, so that the projecting portion of the first object 21 and the recessed portion of the second object 22 come into contact with each other at two contact points. Although this movement may make contact at three contact points, the same as above holds true.

FIG. 14a illustrates the mode in which the distal end portion of the projecting portion of the first object 21 is viewed in the plane defined by the X- and Y-axes of the force measuring coordinate system CFa for posture calculation, when the projecting portion of the first object 21 and the recessed portion of the second object 22 come into contact with each other at three contact points. The contact points Pe1 and Pe2 are located in the plane defined by the X- and Y-axes of the force measuring coordinate system CFa for posture calculation. The angle β is formed between the negative direction of the Y-axis and a segment connecting the point Oa to the contact point Pe1 in the projecting portion of the first object 21, in the plane defined by the X- and Y-axes of the force measuring coordinate system for posture calculation.

Assume herein that the setting of a force measuring coordinate system CFa for posture calculation is complete and the X- and Y-axes of the force measuring coordinate system CFa for posture calculation have certain postures, as illustrated as FIG. 14*a*, with respect to the Z-axis of the force measuring coordinate system CFa for posture calculation.

Let Fx be the force in the X-axis direction, Fy be the force in the Y-axis direction, Fz be the force in the Z-axis direction, Mx be the force about the X-axis, My be the force about the Y-axis, and Mz be the force about the Z-axis, in the force measuring coordinate system CFa for posture calculation. As described earlier, the angle β is formed between the negative direction of the Y-axis and a segment connecting the point Oa to the contact point Pe1 in the projecting portion of the first object 21, in the plane defined by the X- and Y-axes of the force measuring coordinate system for posture calculation. μ is the coefficient of static friction. The contact point Pe1 receives a force Fe acting in the Z-axis direction in the force measuring coordinate system for posture calculation and a force μ*Fe acting in the X-axis direction in the force measuring coordinate system for posture calculation. The contact point Pe2 receives a force Fe acting in the Z-axis direction in the force measuring coordinate system for posture calculation and a force μ*Fe acting in the X-axis direction in the force measuring coordinate system for posture calculation. In the projecting portion of the first object 21 and the recessed portion of the second object 22, the contact points Pe1 and Pe2 are symmetrical about a plane which is perpendicular to a plane including the edge defining the hole of the recessed portion of the second object 22 and includes the point Oa and the projecting portion central axis La. In other words, the positions of the contact points Pe1 and Pe2 in the force measuring coordinate system CFa for posture calculation have equal X- and Z-values, and Y-values having equal absolute values and opposite signs. The positions of the contact points Pe1 and Pe2 in the coordinate system CFb set for the recessed portion of the second object 22 have equal X- and Z-values, and Y-values having equal absolute values and opposite signs.

In this case, assuming that the coefficient of static friction μ can be approximated to zero, Fx, Fy, Fz, Mx, My, and Mz are given by the following expressions (3)-(8):

$$Fx=0 \quad (3)$$

$$Fy=0 \quad (4)$$

$$Fz=2*Fe \quad (5)$$

$$Mx=0 \quad (6)$$

$$My=2*Fe*r*\mathrm{Sin}(\beta) \quad (7)$$

$$Mz=0 \quad (8)$$

Another force measuring coordinate system CFa for posture calculation will be considered next. When the projecting portion of the first object 21 and the recessed portion of the second object 22 come into contact with each other at three contact points, given the above-mentioned coordinate system used as a reference coordinate system with the same Z-axis and the X- and Y-axes replaced with the X'- and Y'-axes, respectively, a coordinate system defined by X- and Y-axes obtained by rotating the reference coordinate system through θ about the Z-axis is set as the other coordinate system. In other words, a coordinate system identical to the reference coordinate system illustrated as FIG. 14*a* is obtained by rotating another coordinate system through −θ about the Z-axis. A force obtained by transforming the force acting between the projecting portion of the first object 21 and the recessed portion of the second object 22 to that in the other coordinate system will be considered hereinafter.

FIG. 14*b* illustrates the mode in which the projecting portion of the first object 21 and the recessed portion of the second object 22 come into contact with each other at three contact points, when viewed in the plane defined by the X- and Y-axes of the force measuring coordinate system CFa for posture calculation. The contact points Pe1 and Pe2 are located in the plane defined by the X- and Y-axes of the force measuring coordinate system CFa for posture calculation. The angle β is formed between the negative direction of the Y-axis and a segment connecting the point Oa to the contact point Pe1 in the projecting portion of the first object 21, in the plane defined by the X- and Y-axes of the force measuring coordinate system for posture calculation. FIG. 14*b* further illustrates the X'- and Y'-axes of the above-mentioned reference coordinate system and the X- and Y-axes of another coordinate system.

In this case, assuming that the coefficient of static friction μ can be approximated to zero for a force obtained by transforming the force acting between the projecting portion of the first object 21 and the recessed portion of the second object 22 into that in the other coordinate system, we have the following expressions (9)-(14):

$$Fx=0 \quad (9)$$

$$Fy=0 \quad (10)$$

$$Fz=2*Fe \quad (11)$$

$$Mx=Fe*r*(\mathrm{Sin}(-\theta+\pi/2-\beta)+\mathrm{Sin}(-\theta-\pi/2+\beta)) \quad (12)$$

$$My=Fe*r*(\mathrm{Cos}(-\theta+\pi/2-\beta)+\mathrm{Cos}(-\theta-\pi/2+\beta)) \quad (13)$$

$$Mz=0 \quad (14)$$

From expressions (12) and (13), θ is calculated by the following expression (15), as:

$$\theta=\mathrm{Arctan}(-Mx/My) \quad (15)$$

The angle θ is obtained so that the positive direction of the X-axis includes a component in the direction away from the recessed portion of the second object 22, on the basis of the direction in which the projecting portion of the first object 21 and the recessed portion of the second object 22 are brought close to each other to make them contact, and the condition in which the recessed portion of the second object 22 is located in the negative direction of the Z-axis. On the basis of calculated θ, the above-mentioned reference coordinate system is obtained from the above-mentioned other reference coordinate system. A force measuring coordinate system CFa for posture calculation which satisfies expressions (3) through (8) can thus be set.

In this way, the Y-axis can be set parallel to a line connecting the points Pe1 and Pe2 together, and a coordinate system having as the positive direction of its X-axis, a direction including a component in the direction away from the recessed portion of the second object 22 can be set. This setting method is applicable even when the projecting portion of the first object 21 and the recessed portion of the second object 22 come into contact with each other at three contact points. The setting of a force measuring coordinate system CFa for posture calculation can thus be completed.

The setting of a force measuring coordinate system CFa for posture calculation may be completed in the following way.

The same method as mentioned earlier is used to set the origin and the Z-axis of a force measuring coordinate system CFa for posture calculation and bring the projecting portion of the first object 21 and the recessed portion of the second object 22 into contact with each other at two or three contact points. With this operation, the projecting portion of the first object 21 and the recessed portion of the second object 22 have come into contact with each other at two or three contact points, as described earlier, as illustrated as FIGS. 13a and 13b. The direction of rotation about the Z-axis is subsequently determined for the X- and Y-axes. As long as the X- or Y-axis is determined, the direction of the other axis is also determined.

FIG. 16a illustrates the state in which the projecting portion of the first object 21 and the recessed portion of the second object 22 come into contact with each other at two contact points, as viewed in a cross-section which is perpendicular to the edge defining the hole of the recessed portion of the second object 22 and includes the projecting portion central axis La. Although contact at two points will be described herein, the same applies to contact at three points. As illustrated as FIG. 16a, after the projecting portion of the first object 21 and the recessed portion of the second object 22 come into contact with each other, the projecting portion of the first object 21 is pressed against the recessed portion of the second object 22 with a predetermined target force in a pressing direction Pd1 defined as the negative direction of the Z-axis, and passive force control is performed to adjust the target force to zero in two orthogonal directions perpendicular to the Z-axis.

At this time, when a force acts upon movement across a predetermined distance or less from the current position in the following direction perpendicular to the pressing direction Pd1, force control is performed to press with a predetermined target force and the movement is stopped after a predetermined time. The amount of movement until stop is recorded. Movement is then performed to make a return to the position before movement. Such force control and an operation for detecting the amount of movement at this time are executed. The direction serving both as the moving direction and as the pressing direction at this time includes the point Oa and is defined by a forward vector with reference to the point Oa and a backward vector with reference to the point Oa symmetrical about the Z-axis with respect to the former vector, in a plane perpendicular to the Z-axis. The operation for detecting the amount of movement is performed while changing the direction about the Z-axis, with at least one reciprocating operation in one direction and the direction reverse to the former. For example, a reciprocating operation for detecting the amounts of movement in the forward +Mv1-direction and the backward −Mv1-direction is repeated once or more, and then a reciprocating operation for detecting the amounts of movement in the +Mv2-direction and the −Mv2-direction is repeated once or more, for a plurality of sets of directions including the +Mv1- and −Mv1-directions, the +Mv2- and −Mv2-directions, the +Mv3- and −Mv3-directions, and the +Mv4- and −Mv4-directions.

In this manner, a Y-axis search operation is performed in which in moving the projecting portion of the first object 21, the forward or backward direction when the position of the projecting portion of the first object 21 stays the same, takes a predetermined value or less, or is minimized is determined as the direction on the Y-axis. Such a direction search method or the like is used to search for and detect a direction parallel to a segment connecting two contact points at the distal end portion of the projecting portion of the first object 21 to each other. A search method different from the above-mentioned method and enabling a search for a direction parallel to a segment connecting two contact points at the distal end portion of the projecting portion of the first object 21 to each other may be employed. The positive or negative direction of the Y-axis is further determined by setting the positive direction of the X-axis to a direction including a component in the direction away from the recessed portion of the second object 22, on the basis of the direction in which the projecting portion of the first object 21 and the recessed portion of the second object 22 are brought close to each other to make them contact, and the condition in which the recessed portion of the second object 22 is located in the negative direction of the Z-axis. Alternatively, once X- and Y-axes are set, when movement is performed in the negative direction of the X-axis and stopped upon detection of a force larger than a predetermined value, it may be determined that the setting is correct for a large moment about the Y-axis, and that the X- and Y-axes have opposite signs for a small moment about the Y-axis, and in the latter the positive or negative directions of the X- and Y-axes may be changed.

The setting of a force measuring coordinate system CFa for posture calculation may even be completed in the following way.

A force measuring coordinate system CFa for posture calculation is preset for the projecting portion of the first object 21 such that the setting of a force measuring coordinate system CFa for posture calculation for the first object 21 is completed when the projecting portion of the first object 21 and the recessed portion of the second object 22 come into contact with each other, and the projecting portion of the first object 21 is moved to the recessed portion of the second object 22. In this case, the projecting portion of the first object 21 and the recessed portion of the second object 22 come into contact with each other such that a plane which is perpendicular to the plane including three contact points at which the projecting portion of the first object 21 and the recessed portion of the second object 22 come into contact with each other and includes the projecting portion central axis La becomes a known plane. As described earlier, when the setting of a force measuring coordinate system CFa for posture calculation for the first object 21 is completed in advance, the projecting portion of the first object 21 is pressed with a predetermined target force in the negative direction of the Z-axis of the force measuring coordinate system CFa for posture calculation while being pressed with a predetermined target force in the negative direction of the X-axis of the force measuring coordinate system CFa for posture calculation, passive force control is performed to adjust the target force to zero in the Y-axis direction, the projecting portion of the first object 21 is pressed with a predetermined target force in the Z- and X-axis directions, and when the first object 21 comes to rest, it is determined that the projecting portion of the first object 21 and the recessed portion of the second object 22 have come into contact with each other at three contact points. The predetermined target force may have a magnitude that varies for each direction. The projecting portion of the first object 21 may be pressed with a predetermined target force in the negative direction of the Z-axis of the force measuring coordinate system CFa for posture calculation, and passive force control may be performed to adjust the target force to zero in two orthogonal directions perpendicular to the Z-axis, and after the projecting portion of the first object 21 is pressed with a predetermined target force in the Z-axis direction and comes to rest, the projecting portion of the first object 21 may be pressed with a predetermined target force in the negative direction of the Z-axis of the force measuring coordinate system CFa for posture calculation while being pressed with a predetermined target force in the negative direction of the X-axis of the force measuring coordinate system CFa for posture calculation, and passive force control may be performed to adjust the target force to zero in the Y-axis direction to press and move the projecting portion of the first object 21 with a predetermined target force in the Z- and X-axis directions.

To set a force measuring coordinate system CFa for posture calculation in the above-mentioned way, an object such as another mechanism unit may be provided or a moving operation associated with the posture of the projecting portion of the first object 21 may be limited to constrain the relative posture between the projecting portion of the first object 21 and the recessed portion of the second object 22. The projecting portion of the first object 21 and the recessed portion of the second object 22 are thus constrained relative to each other in a plane parallel to a plane including the X- and Z-axes of the force measuring coordinate system CFa for posture calculation. Although the above-mentioned condition associated with the posture is obtained for the projecting portion of the first object 21 and the recessed portion of the second object 22, when, for example, a device or a mechanism unit including a mechanism which satisfies such a condition is used or the driving unit 50 moves the first object 21 relative to the second object 22 under such a condition, the posture about the Z-axis of the force measuring coordinate system CFa for posture calculation for the projecting portion of the first object 21 may not be estimated, so that the relative position and posture between the projecting portion of the first object 21 and the recessed portion of the second object 22 can be more accurately calculated using a minimum preferable method. Hence, when the first object 21 and the second object 22 are flush with each other and vary in relative angle, since the relative posture between the first object 21 and the second object 22 can be calculated on the basis of the force acting between the first object 21 and the second object 22, the relative posture between the first object 21 and the second object 22 can be calculated using a force sensor when mounted for, e.g., another operation or state monitoring, without using other sensors or the like.

The setting of a force measuring coordinate system CFa for posture calculation is thus completed to, in turn, set a position and posture and a homogeneous transformation matrix to the force measuring coordinate system CFa set for the first object 21 with respect to a coordinate system set for a space, a coordinate system set for the driving unit 50, or a tool coordinate system.

Movement for pressing the projecting portion of the first object 21 with a predetermined target force in the negative direction of the Z-axis of the force measuring coordinate system CFa for posture calculation to bring the projecting portion of the first object 21 and the recessed portion of the second object 22 into contact with each other at three points or two points before contact at three points, when the setting of the force measuring coordinate system CFa for posture calculation is complete or in order to complete the setting of the force measuring coordinate system CFa for posture calculation, will be considered hereinafter. When the relative posture between the projecting portion of the first object 21 and the recessed portion of the second object 22 allows their contact at three contact points, the projecting portion of the first object 21 and the recessed portion of the second object 22 can come into contact with each other at two contact points. As described earlier with regard to the condition in which the projecting portion of the first object 21 and the recessed portion of the second object 22 come into contact with each other at three contact points, when the angle α representing the relative posture between the projecting portion of the first object 21 and the recessed portion of the second object 22 is larger than a predetermined value, the projecting portion of the first object 21 and the recessed portion of the second object 22 can come into contact with each other at three contact points.

When the relative posture between the projecting portion of the first object 21 and the recessed portion of the second object 22 is known to be large enough to allow their contact at three contact points, the projecting portion of the first object 21 is moved in the direction in which the projecting portion of the first object 21 and the recessed portion of the second object 22 come into contact with each other, such as the negative direction of the Z-axis of the force measuring coordinate system CFa for posture calculation or the direction toward the recessed portion of the second object 22 in a coordinate system set for a space. After the projecting portion of the first object 21 and the recessed portion of the second object 22 come into contact with each other, the projecting portion of the first object 21 is pressed with a predetermined target force in the negative direction of the Z-axis of the force measuring coordinate system CFa for posture calculation, and passive force control is performed to adjust the target force to zero in two orthogonal directions perpendicular to the Z-axis to move the projecting portion of the first object 21, so that the projecting portion of the first object 21 and the recessed portion of the second object 22 can come into contact with each other at two or three contact points. In this case, when the first object 21 comes to rest, it is determined that the projecting portion of the first object 21 and the recessed portion of the second object 22 have come into contact with each other at two or three contact points.

When it is unknown whether the relative posture between the projecting portion of the first object 21 and the recessed portion of the second object 22 allows their contact at three contact points, movement is performed to change the relative posture between the projecting portion of the first object 21 and the recessed portion of the second object 22 by a predetermined value. In this case, pieces of information such as the direction in which the relative posture changes and the approximate range of relative posture are obtained in advance and the posture is changed by a predetermined value on the basis of the pieces of information to set a relative posture which allows the projecting portion of the first object 21 and the recessed portion of the second object 22 to come into contact with each other at three contact points (the amount of movement of the posture at this time is recorded, the relative position and posture between the projecting portion of the first object 21 and the recessed portion of the second object 22 are calculated, correction is performed by the amount of movement, and the relative posture between the projecting portion of the first object 21 and the recessed portion of the second object 22 before the movement of the posture is calculated). The projecting portion of the first object 21 is then moved in the direction in which the projecting portion of the first object 21 and the recessed portion of the second object 22 come into contact with each other, such as the negative direction of the Z-axis of the force measuring coordinate system CFa for posture calculation or the direction toward the recessed portion of the second object 22 in a coordinate system set for a space. After the projecting portion of the first object 21 and the recessed portion of the second object 22 come into contact with each other, the projecting portion of the first object 21 is pressed with a predetermined target force in the negative direction of the Z-axis of the force measuring coordinate system CFa for posture calculation, and passive force control is performed to adjust the target force to zero in two orthogonal directions perpendicular to the Z-axis to move the projecting portion of the first object 21, so that the projecting portion of the first object 21 and the recessed portion of the second object 22 can come into contact with each other at two or three contact points. In this case, when the first object 21 comes to rest, it is determined that the projecting portion of the first object 21 and the recessed portion of the second object 22 have come into contact with each other at two or three contact points.

When the range of relative posture between the projecting portion of the first object 21 and the recessed portion of the second object 22 is too narrow to bring them into contact with each other at three contact points, movement is performed to change the posture by a predetermined angle to set the relative posture between the projecting portion of the first object 21 and the recessed portion of the second object 22 to that which allows the projecting portion of the first object 21 and the recessed portion of the second object 22 to come into contact with each other at three contact points (the amount of movement of the posture at this time is recorded, the relative position and posture between the projecting portion of the first object 21 and the recessed portion of the second object 22 are calculated, correction is performed by the amount of movement, and the relative posture between the projecting portion of the first object 21 and the recessed portion of the second object 22 before the movement of the posture is calculated). The projecting portion of the first object 21 is then moved in the direction in which the projecting portion of the first object 21 and the recessed portion of the second object 22 come into contact with each other, such as the negative direction of the Z-axis of the force measuring coordinate system CFa for posture calculation or the direction toward the recessed portion of the second object 22 in a coordinate system set for a space. After the projecting portion of the first object 21 and the recessed portion of the second object 22 come into contact with each other, the projecting portion of the first object 21 is pressed with a predetermined target force in the negative direction of the Z-axis of the force measuring coordinate system CFa for posture calculation, and passive force control is performed to adjust the target force to zero in two orthogonal directions perpendicular to the Z-axis to move the projecting portion of the first object 21, so that the projecting portion of the first object 21 and the recessed portion of the second object 22 can come into contact with each other at two or three contact points. In this case, when the first object 21 comes to rest, it is determined that the projecting portion of the first object 21 and the recessed portion of the second object 22 have come into contact with each other at two or three contact points.

In the above description, it may be determined whether the first object 21 and the second object 22 have a posture which allows them to come into contact with each other at three contact points, on the basis of the magnitude of the moment when the projecting portion of the first object 21 and the recessed portion of the second object 22 come into contact with each other.

As described above, the posture of at least one of the first object 21 and the second object 22 may be changed by a predetermined value or more to set a relative posture which allows the projecting portion of the first object 21 and the recessed portion of the second object 22 to come into contact with each other at three contact points, the amount of movement of the posture at this time may be recorded, the relative posture between the first object 21 and the second object 22 may be calculated, correction may be performed by the recorded amount of movement, and the initial relative posture between the first object 21 and the second object 22 may be calculated.

After the setting of a force measuring coordinate system CFa for posture calculation for the projecting portion of the first object 21 is completed, the first object 21 is moved to bring the projecting portion of the first object 21 and the recessed portion of the second object 22 into contact with each other at three contact points.

FIGS. 15a and 15b each illustrate the state in which the projecting portion of the first object 21 and the recessed portion of the second object 22 come into contact with each other, as viewed in a cross-section taken along a plane which is perpendicular to a plane including the edge defining the hole of the recessed portion of the second object 22 and includes the projecting portion central axis La. The Y-axis of the force measuring coordinate system CFa for posture calculation is perpendicular to the paper surface.

After the setting of a force measuring coordinate system CFa for posture calculation is completed, the projecting portion of the first object 21 is pressed with a predetermined target force in a pressing direction Pd1 defined as the negative direction of the Z-axis and a pressing direction Pd2 defined as the negative-direction of the X-axis, passive force control is performed to adjust the target force to zero in the Y-axis direction to move and press the projecting portion of the first object 21 with a predetermined target force in the pressing directions Pd1 and Pd2, and when the first object 21 comes to rest, it is determined that the projecting portion of the first object 21 and the recessed portion of the second object 22 have come into contact with each other at three contact points. FIG. 15a illustrates a first object 21a representing the position of the projecting portion of the first object 21 when the projecting portion of the first object 21 and the recessed portion of the second object 22 come into contact with each other at two contact points, and the setting of a force measuring coordinate system CFa for posture calculation is completed, as described earlier. FIG. 15a further illustrates the subsequent state in which the projecting portion of the first object 21 and the recessed portion of the second object 22 have come into contact with each other at three contact points upon the above-mentioned movement.

After the setting of a force measuring coordinate system CFa for posture calculation for the projecting portion of the first object 21 is completed, the projecting portion of the first object 21 and the recessed portion of the second object 22 may be moved using another moving method to bring them into contact with each other at three contact points. The projecting portion of the first object 21 is pressed with a predetermined target force in a pressing direction Pd1 defined as the negative direction of the Z-axis of the force measuring coordinate system CFa for posture calculation, and passive force control is performed to adjust the target force to zero in two orthogonal directions perpendicular to the Z-axis to move the projecting portion of the first object 21, so that the projecting portion of the first object 21 and the recessed portion of the second object 22 come into contact with each other at two or three contact points. In this case, when the first object 21 comes to rest upon pressing with a predetermined target force in the pressing direction Pd1, it is determined that the projecting portion of the first object 21 and the recessed portion of the second object 22 have come into contact with each other at two or three contact points. As described earlier, after the setting of a force measuring coordinate system CFa for posture calculation is completed, passive force control is performed to adjust the target force to zero in two orthogonal directions perpendicular to the Z-axis while pressing the projecting portion of the first object 21 with a predetermined target force in a pressing direction Pd1 defined as the negative direction of the Z-axis to rotate it about the Y-axis in the RY-direction defined as the negative direction of rotation about the Y-axis, and when the force about the Y-axis reaches a predetermined target force or contact is detected, it is determined that contact has been made at three contact points and rotation is stopped. This allows the projecting portion of the first object 21 and the recessed portion of the second object 22 to come into contact with each other at three contact points. FIG. 15b illustrates a first object 21a representing the position of the projecting portion of the first object 21 when the the setting of a force measuring coordinate system CFa for posture calculation is completed, and the state in which the projecting portion of the first object 21 and the recessed portion of the second object 22 have come into contact with each other at three contact points upon movement in the pressing direction Pd1 and the RY-direction of rotation about the Y-axis. The angle at which rotation is performed about the Y-axis at this time is recorded, the relative angle between the projecting portion central axis La and the Z-axis of the coordinate system CFb set for the recessed portion of the second object 22 is calculated, and correction is performed by the recorded angle, so that the relative angle between the projecting portion central axis La and the Z-axis of the coordinate system CFb set for the recessed portion of the second object 22 can be calculated for the projecting portion of the first object 21 and the recessed portion of the second object 22 before rotation about the Y-axis.

As illustrated as FIGS. 5b, 5c, 5d, and 5e, when the end portion of the projecting portion forms, e.g., a circle including a cut, the projecting and recessed portions are preferably moved to a position and posture in a predetermined range before contact between the projecting and recessed portions, so that the projecting and recessed portions can come into contact with each other at two or three contact points, as described earlier.

As described earlier, the setting of a force measuring coordinate system CFa for posture calculation is completed, and in this state, the projecting portion of the first object 21 and the recessed portion of the second object 22 come into contact with each other at three contact points on the basis of the setting. This allows the projecting portion of the first object 21 and the edge defining the hole of the recessed portion of the second object 22 to come into contact with each other at three contact points to set the position and posture relationships between the set force measuring coordinate system CFa for posture calculation and the three contact points to those as illustrated as FIGS. 11a to 11c.

The state in which the projecting portion of the first object 21 and the recessed portion of the second object 22 come into contact with each other at three contact points will be considered hereinafter.

When the projecting portion of the first object 21 and the recessed portion of the second object 22 come into contact with each other at the contact points Pe1, Pe2, and Ps, the minimum distance between each of the three contact points and the Z-axis of the force measuring coordinate system CFa for posture calculation that also serves as the projecting portion central axis La takes a constant value r (In this embodiment, the minimum distance between each contact point and the Z-axis of the force measuring coordinate system CFa for posture calculation takes a constant value, but this minimum distance may be determined on the basis of the Z-dimension of the force measuring coordinate system CFa for posture calculation. Even in this case, the relative posture or the relative position and posture between the first object 21 and the second object 22 are calculated using the same method as described in this embodiment). The Z-axis of the force measuring coordinate system CFa for posture calculation that also serves as the projecting portion central axis La is not perpendicular to the plane including the three contact points. The three contact points are located on the edge defining the hole of the recessed portion of the second object 22. The position and posture relationships between the three contact points and the X-, Y-, and Z-axes of the force measuring coordinate system CFa for posture calculation are set in the following way. The Y-axis of the force measuring coordinate system CFa for posture calculation has a positive direction which is parallel to a line connecting the contact points Pe1 and Pe2 to each other and parallel to the direction from the contact point Pe1 to the contact point Pe2. The negative directions of the Z- and X-axes include a component in the direction toward the recessed portion of the second object 22. A plane including the Z- and X-axes of the force measuring coordinate system CFa for posture calculation is perpendicular to the plane including the three contact points.

Subsequently, the position and posture relationship between the force measuring coordinate system CFa for posture calculation and the coordinate system set for the edge defining the hole of the recessed portion of the second object 22 is calculated using the force measuring coordinate system CFa for posture calculation defined in the aforementioned way, the three contact points, and a force obtained by transforming the force acting between the projecting portion of the first object 21 and the recessed portion of the second object 22 into that in the force measuring coordinate system CFa for posture calculation.

To calculate the position and posture of the recessed portion of the second object 22 with respect to the force measuring coordinate system CFa for posture calculation set for the recessed portion of the first object 21, a coordinate system CFb is set for the hole of the recessed portion of the second object 22, as illustrated as FIGS. 11b and 11c. A coordinate system CFb is defined by orthogonal X-, Y-, and Z-axes. The origin of the coordinate system CFb is set as the central point Ob of the edge defining the hole of the recessed portion of the second object 22. The point Ob serves as the central point of the three contact points Pe1, Pe2, and Ps at which the projecting portion of the first object 21 and the recessed portion of the second object 22 come into contact with each other. An axis perpendicular to the plane including the three contact points is set as the Z-axis of the coordinate system CFb. The positive direction of the Z-axis is set to include a component in the direction away from the hole of the recessed portion of the second object 22. The Y-axis of the coordinate system CFb is set parallel to the Y-axis of the force measuring coordinate system CFa for posture calculation and identical in positive direction when the projecting portion of the first object 21 and the recessed portion of the second object 22 come into contact with each other at three contact points. The X-axis of the coordinate system CFb is uniquely determined from the Z- and Y-axes of the coordinate system CFb.

Referring to FIGS. 11a, 11b, and 11c, the force acting between the projecting portion of the first object 21 and the recessed portion of the second object 22 when the projecting portion of the first object 21 and the recessed portion of the second object 22 come into contact with each other at three contact points is represented as a force in the force measuring coordinate system CFa for posture calculation. In other words, a certain force is represented in the force measuring coordinate system CFa for posture calculation, assuming that the certain force acts on the origin of the force measuring coordinate system CFa for posture calculation.

The angle $\alpha$ is formed between the projecting portion central axis La set for the projecting portion of the first object 21 and a normal to the plane including three contact points when the projecting portion of the first object 21 and the recessed portion of the second object 22 come into contact with each other at the three contact points, and is formed between the positive direction of the Z-axis of the coordinate system CFb set for the hole of the recessed portion of the second object 22 and the positive direction of the Z-axis of the force measuring coordinate system CFa for posture calculation, as illustrated as FIG. 11b, as described earlier. $\mu$ is the coefficient of static friction. The contact point Pe1 receives a force Fe acting in the positive direction of the Z-axis in the force measuring coordinate system for posture calculation and a force $\mu$*Fe acting in the positive direction of the X-axis in the force measuring coordinate system for posture calculation, as illustrated as FIG. 11a. The contact point Pe2 receives a force Fe acting in the positive direction of the Z-axis in the force measuring coordinate system for posture calculation and a force $\mu$*Fe acting in the positive direction of the X-axis in the force measuring coordinate system for posture calculation. The contact point Ps receives a force Fs acting in the positive direction of the X-axis in the force measuring coordinate system for posture calculation and a force $\mu$*Fe acting in the positive direction of the Z-axis in the force measuring coordinate system for posture calculation.

When the point of intersection of a perpendicular dropped from the contact point Ps to the projecting portion central axis La is defined as a point Pt, h is the distance from the point Oa to the point Pt, i.e., the position of the point Pt on the Z-axis of the force measuring coordinate system CFa for posture calculation. The angle $\beta$ is formed between the negative direction of the Y-axis and a segment connecting the point Oa to the contact point Pe1, in the plane defined by the X- and Y-axes of the force measuring coordinate system CFa for posture calculation. The angle $\beta'$ is formed between the negative direction of the Y-axis and a segment connecting the point Ob to the contact point Pe1 in the recessed portion of the second object 22, in the plane defined by the X- and Y-axes of the coordinate system CFb set for the recessed portion of the second object 22, as illustrated as FIG. 11c. FIG. 11c theoretically illustrates the projecting portion of the first object 21 and the recessed portion of the second object 22 as separated for the sake of explaining the angle $\beta'$ but, in practice, the projecting portion of the first object 21 and the recessed portion of the second object 22 are in contact with each other at the contact points Pe1, Pe2, and Ps.

As illustrated as FIG. 11a, in the projecting portion of the first object 21 and the recessed portion of the second object 22, the contact points Pe1 and Pe2 are symmetrical about a plane which is perpendicular to the plane including three contact points at which the projecting portion of the first object 21 and the recessed portion of the second object 22 are in contact with each other and includes the projecting portion central axis La. In other words, the positions of the contact points Pe1 and Pe2 in the force measuring coordinate system CFa for posture calculation have equal X- and Z-values, and Y-values having equal absolute values and opposite signs. The positions of the contact points Pe1 and Pe2 in the coordinate system CFb set for the recessed portion of the second object 22 have equal X- and Z-values, and Y-values having equal absolute values and opposite signs.

Upon transformation of the force acting between the projecting portion of the first object 21 and the recessed portion of the second object 22 into a force in the force measuring coordinate system CFa for posture calculation, i.e., a force acting on the origin of the force measuring coordinate system CFa for posture calculation, the force in the X-axis direction is represented as Fx, the force in the Y-axis direction is represented as Fy, the force in the Z-axis direction is represented as Fz, the force about the X-axis is represented as Mx, the force about the Y-axis is represented as My, and the force about the Z-axis is represented as Mz, in the force measuring coordinate system CFa for posture calculation. Fx, Fy, Fz, Mx, My, and Mz are respectively given by the following expressions (16)-(21):

$$Fx=Fs+2*\mu*Fe \tag{16}$$

$$Fz=\mu*Fs+2*Fe \tag{17}$$

$$My=Fs*h+\mu*Fs*r+2*Fe*r*\mathrm{Sin}(\beta) \tag{18}$$

$$Fy=0 \tag{19}$$

$$Mx=0 \tag{20}$$

$$Mz=0 \tag{21}$$

When $\mu$ is known, we have the expressions (22)-(24):

$$Fe=(Fz-\mu*Fx)/(2*(1-\mu*\mu)) \tag{22}$$

$$Fs=(Fx-\mu*Fz)/(1-\mu*\mu) \tag{23}$$

$$(r*Fz-My)*\mu*\mu+\{h*Fz+[\mathrm{Sin}(\beta)-1]*r*Fx\}*\mu+[My-h*Fx-\mathrm{Sin}(\beta)*r*Fz]=0 \tag{24}$$

When $\mu \approx 0$ ($\mu$ is as small as nearly zero), My can be approximated by the expression (25), as:

$$My \approx h*Fx+\mathrm{Sin}(\beta)*r*Fz \tag{25}$$

The position and posture relationships between the force measuring coordinate system CFa for posture calculation, the three contact points Pe1, Pe2, and Ps at which the projecting portion of the first object 21 and the recessed portion of the second object 22 come into contact with each other, and the coordinate system CFb set for the recessed portion of the second object 22 will be considered hereinafter.

The positions of the contact points Ps, Pe1, and Pe2 for the force measuring coordinate system CFa for posture calculation are given by expressions (26), (28), and (30), respectively, and the positions of the contact points Ps, Pe1, and Pe2 with respect to the coordinate system CFb set for the recessed portion of the second object 22 are given by expressions (27), (29), and (31), respectively, as:

$$P(\text{Point } Ps\_\text{Coordinate System } CFa) = [-r, 0, h]^T \quad (26)$$

$$P(\text{Point } Ps\_\text{Coordinate System } CFb) = [-R, 0, 0]^T \quad (27)$$

$$P(\text{Point } Pe1\_\text{Coordinate System } CFa) = [-r^*\text{Sin}(\beta), -r^*\text{Cos}(\beta), 0]^T \quad (28)$$

$$P(\text{Point } Pe1\_\text{Coordinate System } CFb) = [R^*\text{Sin}(\beta'), -R^*\text{Cos}(\beta'), 0]^T \quad (29)$$

$$P(\text{Point } Pe2\_\text{Coordinate System } CFa) = [-r^*\text{Sin}(\beta), r^*\text{Cos}(\beta), 0]^T \quad (30)$$

$$P(\text{Point } Pe2\_\text{Coordinate System } CFb) = [R^*\text{Sin}(\beta'), R^*\text{Cos}(\beta'), 0]^T \quad (31)$$

β and β' satisfy the condition of the following expression (32):

$$R^*\text{Cos}(\beta') = r^*\text{Cos}(\beta) \quad (32)$$

From the coordinate system CFb set for the recessed portion of the second object 22, a homogeneous transformation matrix Tb to the force measuring coordinate system CFa for posture calculation is given by the expression (33):

$$Tb = \begin{bmatrix} \text{Cos}(-\alpha) & 0 & \text{Sin}(-\alpha) & \Delta Px \\ 0 & 1 & 0 & 0 \\ -\text{Sin}(-\alpha) & 0 & \text{Cos}(-\alpha) & \Delta Pz \\ 0 & 0 & 0 & 1 \end{bmatrix} \quad (33)$$

where ΔPx is the position of the point Oa in the X-axis direction in the coordinate system CFb set for the recessed portion of the second object 22. ΔPz is the position of the point Oa in the Z-axis direction in the coordinate system CFb set for the recessed portion of the second object 22.

Using the homogeneous transformation matrix Tb and the positions of the contact points Ps, Pe1, and Pe2 in the coordinate system CFa, the positions of the contact points Ps, Pe1, and Pe2 in the coordinate system CFb are respectively given by the following expressions (34)-(36):

$$[P(\text{Point } Ps\_\text{Coordinate System } CFb)^T, 1]^T = Tb \cdot [P(\text{Point } Ps\_\text{Coordinate System } CFa)^T, 1]^T \quad (34)$$

$$[P(\text{Point } Pe1\_\text{Coordinate System } CFb)^T, 1]^T = Tb \cdot [P(\text{Point } Pe1\_\text{Coordinate System } CFa)^T, 1]^T \quad (35)$$

$$[P(\text{Point } Pe2\_\text{Coordinate System } CFb)^T, 1]^T = Tb \cdot [P(\text{Point } Pe2\_\text{Coordinate System } CFa)^T, 1]^T \quad (36)$$

From expressions (26) through (36), when the projecting portion of the first object 21 and the recessed portion of the second object 22 are in contact with each other at three contact points, conditions of the following expressions (37)-(41) are derived in the coordinate system CFb set for the recessed portion of the second object 22 as:

$$R^*\text{Sin}(\beta') + r^*\text{Sin}(\beta)^*\text{Cos}(\alpha) = \Delta Px \quad (37)$$

$$R^*\text{Cos}(\beta') = r^*\text{Cos}(\beta) \quad (38)$$

$$r^*\text{Sin}(\beta)^*\text{Sin}(\alpha) = \Delta Pz \quad (39)$$

$$r^*\text{Cos}(\alpha) + h^*\text{Sin}(\alpha) = R + \Delta Px \quad (40)$$

$$-r^*\text{Sin}(\alpha) + h^*\text{Cos}(\alpha) = -\Delta Pz \quad (41)$$

R is nearly equal to, i.e., can be approximated to r. Then, β can be approximated to β'.

From expressions (37) through (41), h, β, ΔPx, and ΔPz are respectively calculated by the following expressions (42)-(45), as:

$$h = 2^*r^*(1-\text{Cos}(\alpha))/\text{Sin}(\alpha) \quad (42)$$

$$\beta = \text{Arcsin}((1-\text{Cos}(\alpha))/(1+\text{Cos}(\alpha))) \quad (43)$$

$$\Delta Px = r^*(1-\text{Cos}(\alpha)) \quad (44)$$

$$\Delta Pz = r^*\text{Sin}(\alpha)^*(1-\text{Cos}(\alpha))/(1+\text{Cos}(\alpha)) \quad (45)$$

Substituting expressions (42) and (43) into expression (25) yields an angle α by expression (46), as:

$$\alpha = 2 * \text{Arctan}\left(-\frac{Fx}{Fz} + \frac{\sqrt{r*(r*Fx*Fx + Fz*My)}}{r*Fz}\right) \quad (46)$$

The position of the point Oa of the force measuring coordinate system CFa for posture calculation on the X-, Y-, and Z-axes in the coordinate system CFb set for the recessed portion of the second object 22 is calculated as:

$$P(\text{Point } Oa\_\text{Coordinate System } CFb) = [r^*(1-\text{Cos}(\alpha)), 0, r^*\text{Sin}(\alpha)^*(1-\text{Cos}(\alpha))/(1+\text{Cos}(\alpha))]^T \quad (47)$$

The angle α and the position of the force measuring coordinate system CFa for posture calculation with respect to the coordinate system CFb set for the recessed portion of the second object 22 are thus calculated. The positions of three contact points with respect to the coordinate system CFb set for the recessed portion of the second object 22 are further calculated. This, in turn, calculates the position and posture of the projecting portion of the first object 21 relative to the recessed portion of the second object 22.

Expression (42) reveals that in order to bring the projecting portion of the first object 21 and the recessed portion of the second object 22 into contact with each other at three contact points, the solid cylinder formed by the projecting portion of the first object 21 preferably has a length of $2^*r^*(1-\text{Cos}(\alpha))/\text{Sin}(\alpha)$ or more in the direction along the projecting portion central axis La. Since h and β are obtained from expressions (42) and (43), the positions of the contact points Pe1, Pe2, and Ps in the coordinate system CFa can be obtained to, in turn, obtain the positions of contact points in the first object 21.

Figure 5A:
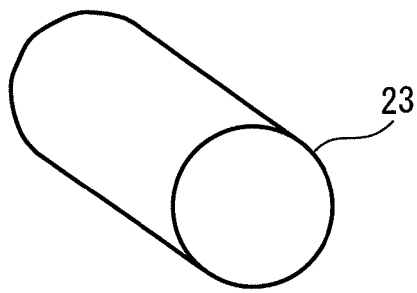
FIGS. 5a to 5h are views illustrating exemplary shapes of the projecting portion included in at least one of the first object and the second object.
Figure 5B:
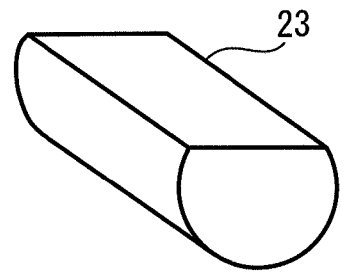
Figure 5C:
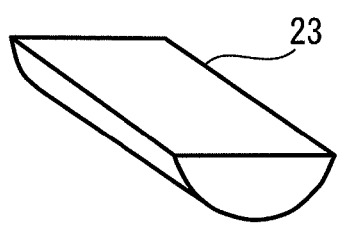
Figure 5D:
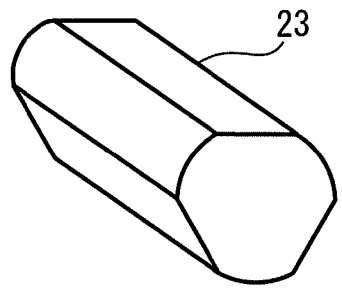
Figure 5E:
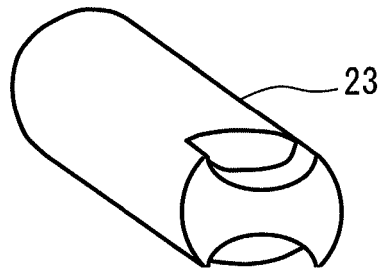
Figure 5F:
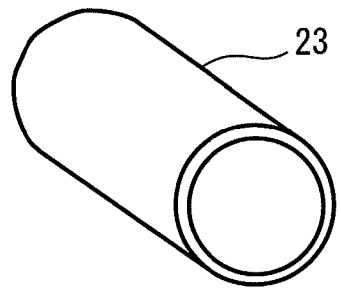
Figure 5G:
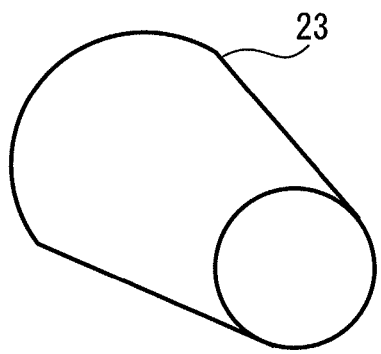
Figure 5H:
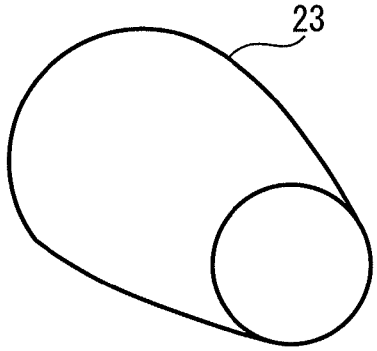

Although the above description assumes that the projecting portion of the first object 21 forms a solid cylinder, a shape with which the minimum distance between each contact point and the projecting portion central axis is determined on the basis of the distance between the point of intersection of a perpendicular dropped from each contact point to the projecting portion central axis with the projecting portion central axis, and a predetermined point (a point other than the point of intersection) on the projecting portion central axis, such as a shape which varies in diameter depending on the distance in the axial direction of the projecting portion central axis La from the end of the projecting portion of the first object 21, including a tapered shape, as illustrated as FIGS. 5g and 5h, will be described below.

FIG. 12a illustrates the state in which the projecting portion of the first object 21 and the recessed portion of the second object 22 are in contact with each other at three contact points when the projecting portion of the first object 21 forms a truncated cone and the recessed portion of the second object 22 forms a hole. FIG. 12b illustrates the state in which the projecting portion of the first object 21 and the recessed portion of the second object 22 are in contact with each other at three contact points, as viewed in a cross-section taken along a plane which is perpendicular to the plane including the three contact points and includes the projecting portion central axis of the first object 21, when the projecting portion of the first object 21 forms a truncated cone and the recessed portion of the second object 22 forms a hole. Assume herein that the projecting portion of the first object 21 is changed from the above-mentioned solid cylinder as illustrated as FIGS. 11*a* to 11*c* to a shape, such as a truncated cone, which varies in diameter depending on h in the axial direction of the projecting portion central axis La while the end of the projecting portion has the same circular shape as in the solid cylinder as illustrated as FIGS. 12*a* to 12*b*, and the projecting portion of the first object 21 comes into contact with the recessed portion of the second object 22 at three contact points. Conditions and details other than the change in diameter of an object formed by the projecting portion in the axial direction of the projecting portion central axis La are the same as described earlier. The predetermined point on the projecting portion central axis is set to the origin of the force measuring coordinate system for posture calculation. In this case, only the position of the contact point Ps in the negative direction of the X-axis in the force measuring coordinate system CFa for posture calculation changes. Under such circumstances, when a radius r' of the projecting portion of the first object 21 is determined from h, geometric conditions in the coordinate system CFb set for the recessed portion of the second object 22 when the projecting portion of the first object 21, like the above-mentioned object, and the recessed portion of the second object 22 are in contact with each other at three contact points are similarly derived by changing r in expressions (40) and (41) of expressions (37) through (41) to the distance r' calculated from h, e.g., Constant A*h+Constant B, Constant A*h*h, or the like. Under the above-mentioned conditions, when the minimum distance between the contact point Ps and the projecting portion central axis is represented as r', expressions (40) and (41) are respectively rewritten by the expressions (48) and (49) as:

$$r'{*}\text{Cos}(\alpha)+h{*}\text{Sin}(\alpha)=R+\Delta Px \qquad (48)$$

$$-r'{*}\text{Sin}(\alpha)+h{*}\text{Cos}(\alpha)=-\Delta Pz \qquad (49)$$

Regarding the above description, a specific case where the projecting portion of the first object 21 is changed from a solid cylinder to a truncated cone will be considered hereinafter. The truncated cone formed by the projecting portion of the first object 21 and the recessed portion of the second object 22 come into contact with each other at the three contact points Pe1, Pe2, and Ps, as illustrated as FIGS. 12*a* and 12*b*. Parameters and the like illustrated as FIGS. 12*a* and 12*b* are the same as those as illustrated as FIGS. 11*a* and 11*b* or as described earlier. The diameter of an object formed by the projecting portion changes in the axial direction of the projecting portion central axis La, unlike the conditions illustrated as FIGS. 11*a* to 11*c*. The minimum distance from each of the contact points Pe1 and Pe2 to the projecting portion central axis La is defined as r, as illustrated as FIGS. 12*a* and 12*b*. The point of intersection of a perpendicular dropped from the contact point Ps to the projecting portion central axis La with the projecting portion central axis La is defined as Pt. The distance between the point of intersection Pt and the point Oa serving as a predetermined point on the projecting portion central axis La is defined as h. The minimum distance between the contact point Ps and the projecting portion central axis La is equal to the distance between the contact points Ps and Pt, which is determined as r+a*h in accordance with the shape of the truncated cone formed by the projecting portion of the first object 21, where a is a constant. In this manner, when the projecting portion of the first object 21 forms a truncated cone, above-mentioned expressions (40) and (41) when the projecting portion of the first object 21 forms a solid cylinder are respectively rewritten by the expressions (50) and (51), as:

$$(r+a{*}h){*}\text{Cos}(\alpha)+h{*}\text{Sin}(\alpha)=R+\Delta Px \qquad (50)$$

$$-(r+a{*}h){*}\text{Sin}(\alpha)+h{*}\text{Cos}(\alpha)=-\Delta Pz \qquad (51)$$

The use of rewritten expressions (50) and (51) and original expressions (37), (38), (39), (41), and (25) yields an angle α in the same way as described earlier.

As described above, not only when the minimum distance between each contact point and the projecting portion central axis takes a constant value, but also when the minimum distance between each contact point and the projecting portion central axis is determined on the basis of the distance between the point of intersection of a perpendicular dropped from each contact point to the projecting portion central axis with the projecting portion central axis, and a predetermined point (a point other than the point of intersection) on the projecting portion central axis, the angle α and the position of the force measuring coordinate system CFa for posture calculation with respect to the coordinate system CFb set for the recessed portion of the second object 22 are calculated to, in turn, calculate the position and posture of the projecting portion of the first object 21 relative to the recessed portion of the second object 22. When the truncated cone-shaped side surface of the projecting portion of the first object 21 is pressed against a plane located on the second object 22, such as a plane including the edge defining the hole of the recessed portion of the second object 22, it suffices to obtain an angle θc of the tapered portion and rotate and press the truncated cone formed by the projecting portion of the first object 21, using the angles α and θc.

A homogeneous transformation matrix from the force measuring coordinate system CFa for posture calculation to the coordinate system CFb set for the recessed portion of the second object 22 is calculated from a matrix inverse to the homogeneous transformation matrix Tb represented by expressions (33), (44), (45), and (46). In other words, the position and posture relationship between the force measuring coordinate system CFa for posture calculation and the coordinate system set for the edge defining the hole of the recessed portion of the second object 22 is obtained. Thus, the posture of a plane including the edge and the central position of the edge defining the hole of the recessed portion of the second object 22 relative to the projecting portion of the first object 21 can be calculated to, in turn, calculate the position and posture of the recessed portion of the second object 22 relative to the projecting portion of the first object 21. Note that when it suffices to obtain the posture of a plane including the edge and the central position of the edge defining the hole of the recessed portion of the second object 22, no position and posture relationship between the coordinate system CFb set for the recessed portion of the second object 22 and the coordinate system representing the position and posture of the second object 22 may be obtained.

A position and posture and a homogeneous transformation matrix to the force measuring coordinate system CFa for posture calculation with respect to a coordinate system set for a space, a coordinate system set for the driving unit 50, or a tool coordinate system can be set or calculated in the above-mentioned way.

A position and posture and a homogeneous transformation matrix to the coordinate system CFb set for the recessed portion of the second object 22 with respect to, e.g., a coordinate system set for a space, a coordinate system set for the driving unit 50, or a tool coordinate system can be calculated on the basis of a homogeneous transformation matrix to the force measuring coordinate system CFa for posture calculation with respect to each of these coordinate systems, and a homogeneous transformation matrix from the force measuring coordinate system CFa for posture calculation to the coordinate system CFb set for the recessed portion of the second object 22.

When the relationship between the coordinate system CFb set for the recessed portion of the second object 22 and the coordinate system representing the position and posture of the second object 22 has been set, known, or calculated, the position and posture of the second object 22 with respect to, e.g., a coordinate system set for a space, a coordinate system set for the driving unit 50, or a tool coordinate system can be calculated on the basis of a homogeneous transformation matrix from the coordinate system CFb set for the recessed portion of the second object 22 to the coordinate system representing the position and posture of the second object 22, and a homogeneous transformation matrix from, e.g., a coordinate system set for a space, a coordinate system set for the driving unit 50, or a tool coordinate system to the coordinate system CFb set for the recessed portion of the second object 22.

When the coordinate system CFb set for the recessed portion of the second object 22 and the coordinate system representing the position and posture of the second object 22 are different from each other only in posture about the Z-axis of the coordinate system CFb set for the recessed portion of the second object 22, the posture about the Z-axis of the coordinate system CFb may be calculated by calculating the posture of a plane located in another recessed portion of the second object 22 or by bringing the first object 21 into contact with another portion of the second object 22, detecting it, and calculating the angle about the Z-axis of the coordinate system CFb. In this manner, a posture which may not be calculated may be obtained using features of the shape of the second object 22.

A coordinate system representing the position and posture of the second object 22 may be preset with as its Y-axis an axis parallel to a line connecting together the contact points Pe1 and Pe2 between the projecting portion of the first object 21 and the recessed portion of the second object 22, and the positive direction of its X-axis may be preset in consideration of the state in which the projecting portion of the first object 21 and the recessed portion of the second object 22 come into contact with each other.

The position and posture relationship between the force measuring coordinate system CFa for posture calculation and the coordinate system representing the position and posture of the second object 22 may be calculated using a plurality of recessed portions arranged in the second object 22 and having known position and/or posture relationships between themselves. First, the position and posture relationship between the force measuring coordinate system CFa for posture calculation and a coordinate system CFb set for one recessed portion located on the second object 22 is calculated. Then, the position and posture relationship between the force measuring coordinate system CFa for posture calculation and a coordinate system CFb' set for another recessed portion located on the second object 22 is calculated. The position and posture relationship between the force measuring coordinate system CFa for posture calculation and the coordinate system representing the position and posture of the second object 22 may be calculated on the basis of the above-mentioned result and the known position and/or posture relationship between one recessed portion located on the second object 22 and another recessed portion located on the second object 22. In this case, position and posture relationships with the force measuring coordinate system CFa for posture calculation may be calculated for the plurality of recessed portions to, in turn, calculate the position and posture of the second object 22 for higher dimensions or more accurately calculate the relative position and posture between the first object 21 and the second object 22. In this manner, the shapes of the first object 21 and the second object 22 or a plurality of projecting portions or recessed portions located on the first object 21 or the second object 22 may be used to calculate the position and posture of the second object 22 for higher dimensions or more accurately calculate the relative position and posture between the first object 21 and the second object 22.

A method for calculating a deviation in posture about the Z-axis of the coordinate system CFb when the coordinate system representing the position and posture of the second object 22 and the coordinate system CFb set for the recessed portion of the second object 22 are different from each other only in posture about the Z-axis of the coordinate system CFb, using another recessed portion located on the second object 22, will be described below with reference to FIG. 17.

The second object 22 includes recessed portions 22a and 22b, as illustrated as FIG. 17. The recessed portions 22a and 22b of the second object 22 form hollow cylinders having the same diameter. The projecting portion of the first object 21 also forms a hollow cylinder having the same diameter as that of the recessed portions 22a and 22b of the second object 22. The central axes of the hollow cylinders formed by the recessed portions 22a and 22b of the second object 22 are orthogonal to each other. The position and posture of the second object 22 are represented by a coordinate system CF0. The coordinate system CF0 is defined by three orthogonal axes: an X-axis denoted by X0, a Y-axis denoted by Y0, and a Z-axis denoted by Z1 in FIG. 17, and has a point Ob as its origin. A coordinate system set for the second object 22 when the relative position and posture between the projecting portion of the first object 21 and the recessed portion 22a of the second object 22 are calculated by bringing the projecting portion of the first object 21 and the recessed portion 22a of the second object 22 into contact with each other at three contact points is defined as a coordinate system CFb. The coordinate system CFb is defined by orthogonal axes: an X-axis denoted by X1, a Y-axis denoted by Y1, and a Z-axis denoted by Z1 in FIG. 17, and has a point Ob as its origin. The coordinate systems CF0 and CFb have the same origin and Z-axis. The coordinate systems CF0 and CFb are different from each other only in posture about the Z-axis of the coordinate system CFb.

A coordinate system set for the second object 22 when the relative position and posture between the projecting portion of the first object 21 and the recessed portion 22b of the second object 22 are calculated by bringing the projecting portion of the first object 21 and the recessed portion 22b of the second object 22 into contact with each other at three contact points is defined as a coordinate system CFb2. The coordinate system CFb2 is defined by orthogonal axes: an X-axis denoted by X2, a Y-axis denoted by Y2, and a Z-axis denoted by Z2 in FIG. 17, and has a point Ob2 as its origin. The relative position and posture between the coordinate systems CFb and CFb2 can thus be calculated on the basis of the position and posture of the coordinate system CFa.

Assume that a coordinate system CF0 is calculated by rotating the coordinate system CFb about the Z-axis of the coordinate system CFb. The coordinate system CFb is rotated about the Z-axis of the coordinate system CFb such that the plane including the X- and Y-axes of the coordinate system CFb2 and the Y-axis of the coordinate system CFb are made parallel to each other, the point Ob2 is located in the positive direction of the X-axis after rotation, or the X-axis is made parallel and identical in direction to the Z-axis of the coordinate system CFb2. A coordinate system CF0 can thus be calculated by rotating the coordinate system CFb about the Z-axis of the coordinate system CFb. In this manner, a three-dimensional position and posture of the second object 22 relative to the first object 21 can be calculated to, in turn, calculate a posture having higher degrees of freedom, using the relative position and posture relationships between a plurality of recessed portions located on the second object 22. The position and posture of the second object 22 can even be more accurately calculated on the basis of the positions and postures of a plurality of recessed portions located on the second object 22.

As described above, a posture having multiple degrees of freedom or a more accurate position and posture can be calculated using a plurality of projecting portions or recessed portions located on the first object 21 or the second object 22, and the relative position and posture relationships between the plurality of projecting portions or recessed portions located on the first object 21 or the second object 22. The quality of the second object 22, i.e., the quality of an object, such as a workpiece or a tool, may be determined on the basis of the relative position and posture between the recessed portions 22a and 22b of the second object 22. It may be determined whether, for example, a workpiece or a tool as a target for determination is an object in a state different from an intended state, is a defective product, is an object of a type different from an intended type, or is a damaged workpiece.

Another embodiment of a shape which allows the first object 21 or the second object 22 to include a plurality of projecting portions or recessed portions, as mentioned above, will be described below.

FIGS. 18a to 18d are views illustrating another example of a first object 21 and a second object 22 including a plurality of projecting portions or recessed portions. As the projecting or recessed portions included in the first object 21 or the second object 22, three hollow cylindrical portions may be formed with their central axes orthogonal to each other, as illustrated as FIG. 18a. As the projecting or recessed portions included in the first object 21 or the second object 22, two hollow cylindrical portions may be formed with their central axes orthogonal to each other, as illustrated as FIG. 18b. As the recessed portions included in the first object 21 or the second object 22, three holes may be formed with their central axes orthogonal to each other, as illustrated as FIG. 18c. As the recessed portions included in the first object 21 or the second object 22, two holes may be formed with their central axes orthogonal to each other, as illustrated as FIG. 18d. A plurality of projecting portions or recessed portions may be included in the first object 21 or the second object 22, as illustrated as FIGS. 18a, 18b, 18c, and 18d. An object including a plurality of projecting portions or recessed portions, as illustrated as FIGS. 18a, 18b, 18c, and 18d, may be removably attached to the first object 21 or the second object 22.

In the above-mentioned way, the object posture calculation unit 32 can use the driving unit 50 to move the first object 21 and the second object 22 relative to each other to bring the first object 21 and the second object 22 into contact with each other, and calculate the relative position and/or posture between the first object 21 and the second object 22 on the basis of the force measured by the force measuring unit 31 when the first object 21 and the second object 22 come into contact with each other at three contact points, and the minimum distance between each contact point and the projecting portion central axis. The position and/or posture of the first object 21 with respect to a coordinate system, such as a coordinate system set for a space, a coordinate system set for the driving unit 50, or a tool coordinate system, may be calculated using the calculated relative position and/or posture between the first object 21 and the second object 22. The position and/or posture of the second object 22 with respect to a coordinate system, such as a coordinate system set for a space, a coordinate system set for the driving unit 50, or a tool coordinate system, may further be calculated. The position and/or posture of a coordinate system such as a coordinate system set for a space, a coordinate system set for the driving unit 50, or a tool coordinate system with respect to the second object 22 may even be calculated.

In a second embodiment of the present invention, with respect to the object posture calculation system 11 according to the first embodiment of the present invention, preferably, a first object 21 includes at least two projecting portions or at least two recessed portions, a second object 22 includes at least two projecting portions or at least two recessed portions, or each of the first object 21 and the second object 22 includes at least two projecting portions or at least two recessed portions.

For the projecting and recessed portions described in the first embodiment of the present invention, for example, the second object 22 may include at least two recessed portions and the first object 21 may include at least one projecting portion which can come into contact with each recessed portion at three contact points. The second object 22 may include at least two recessed portions and the first object 21 may include at least one projecting portion which can come into contact with each recessed portion at three contact points. The second object 22 may include at least one recessed portion and at least one projecting portion, and the first object 21 may include at least one projecting portion which can come into contact with each recessed portion of the second object 22 at three contact points and at least one recessed portion which can come into contact with each projecting portion of the second object 22 at three contact points.

Including such a plurality of projecting portions or recessed portions allows an object contactable at three contact points to come into contact with the projecting or recessed portions at a ready-to-move position, in accordance with the system conditions of, e.g., a region movable as a mechanism unit for the driving unit 50, a region movable by interference with the object, or a contactable portion in the object. Further, a more accurate relative position and/or posture between the first object 21 and the second object 22 and even an arbitrary three-dimensional position and posture can be calculated by calculating the relative position and/or posture between parts forming the plurality of projecting portions or recessed portions in one object and calculating the relative position and/or posture between parts forming the plurality of projecting portions or recessed portions having known position and/or posture relationships between themselves in one object.

For example, two recessed portions having a known relative position and posture may be attached to the second object 22 to calculate the position and posture of the second object 22 on the basis of the information concerning the positions and postures of the two recessed portions, as described earlier. As another example, the plurality of projecting portions or recessed portions may be attached to the second object 22 to calculate only the positions of the projecting portions or recessed portions for the plurality of parts and, in turn, calculate the position and posture of the second object 22 on the basis of the information concerning the plurality of positions.

In a third embodiment of the present invention, with respect to the object posture calculation system 11 according to the first or second embodiment of the present invention, preferably, at least one object selected from the projecting portion and the recessed portion and included in the first object 21 or the second object 22 is removably attached to the first object 21 or the second object 22.

For the projecting and recessed portions described in the first embodiment of the present invention, at least one of the projecting portion and the recessed portion can be removably attached to the first object 21 or the second object 22 holding the object, i.e., a removable object can be used as the projecting portion or the recessed portion to attach at least one of the projecting portion and the recessed portion to the first object 21 or the second object 22 only when it is desired to calculate the relative position and/or posture between the first object 21 and the second object 22.

Thus, even for an object having no part such as the projecting or recessed portion, the projecting or recessed portion can be included as appropriate. The projecting or recessed portion can be detached after calculation of the relative position and/or posture between the first object 21 and the second object 22.

After the projecting or recessed portion is attached to one portion of the first object 21 or the second object 22, and the relative position and/or posture between the first object 21 and the second object 22 is calculated, the attached projecting or recessed portion is removed. Then, after the projecting or recessed portion is attached to another portion of the first object 21 or the second object 22, and the relative position and/or posture between the first object 21 and the second object 22 is calculated, the attached projecting or recessed portion is removed. The above-mentioned operation may be performed a plurality of times to calculate a more accurate relative position and/or posture between the first object 21 and the second object 22 and even an arbitrary three-dimensional position and posture.

In a fourth embodiment of the present invention, with respect to the object posture calculation system 11 according to any one of the first to third embodiments of the present invention, preferably, before the first object 21 and the second object 22 come into contact with each other at the three contact points, the first object 21 and the second object 22 are moved to a relative approximate position and approximate posture in advance so that the relative position and posture between the first object 21 and the second object 22 fall within a predetermined range of position and posture.

As long as the first object 21 and the second object 22 are moved to an approximate relative position and posture which fall within a predetermined range of position and posture, the relative position and/or posture between the first object 21 and the second object 22 can be calculated, as described in the first embodiment of the present invention.

In this case, after an approximate position and posture of the first object 21 or the second object 22 are automatically detected using a contact-type sensor which detects a touch or a sense of force or touch, such as a force sensor, a torque sensor, a touch sensor, or a contact sensor, the first object 21 and the second object 22 may be moved to an approximate relative position and posture which fall within a predetermined range of position and posture.

After an approximate position and posture of the first object 21 or the second object 22 are automatically detected using a noncontact-type sensor which exploits, e.g., a camera, a laser, an LED, or ultrasound, the first object 21 and the second object 22 may be moved to an approximate relative position and posture which fall within a predetermined range of position and posture. In this case, after the first object 21 and the second object 22 are moved to an approximate range of position and posture using a sensor which can hardly detect the position and/or posture of an object with high accuracy or can recognize only an approximate position and/or posture of an object, the relative position and posture between the first object 21 and the second object 22 can be more accurately calculated.

The operator or the teacher may move the driving unit 50 to guide it to move the first object 21 and the second object 22 to an approximate relative position and posture which fall within a predetermined range of position and posture, using the above-mentioned contact- or noncontact-type sensor.

A teaching operation device implemented in, e.g., an acceleration sensor or a gyro sensor may be employed to operate translation and rotation of the driving unit using the tilt, acceleration, and the like of the teaching operation device in a three-dimensional space to move the first object 21 and the second object 22 to an approximate relative position and posture which fall within a predetermined range of position and posture.

The first object 21 or the second object 22 to be moved by the driving unit 50 may be moved to a designated position or position and posture in a space using a device which exploits, e.g., a camera, a laser, an LED, or ultrasound to designate a position or a position and posture in a space and to, in turn, move the first object 21 and the second object 22 to an approximate relative position and posture which fall within a predetermined range of position and posture.

It may be the case that the relative position and posture between the first object 21 and the second object 22 are set using, e.g., a CAD model of the system on, e.g., a personal computer or a teaching device connected to the driving unit controller 52 in a wired or wireless fashion, and the first object 21 and the second object 22 are set at an approximate relative position and posture which fall within a predetermined range of position and posture when the actual first object 21 and second object 22 are moved relative to each other by the driving unit 50 on the basis of the setting.

As described above, even when a variety of methods are used to coarsely move the first object 21 and the second object 22 to an approximate relative position and posture which fall within a predetermined range of position and posture, the relative position and/or posture between the first object 21 and the second object 22 can be calculated, as described in the first embodiment of the present invention. Thus, the first object 21 or the second object 22 to be moved by the driving unit 50 can be accurately moved to a desired position and/or posture, and a desired task can be appropriately executed, on the basis of the calculated relative position and/or posture.

In a fifth embodiment of the present invention, with respect to the object posture calculation system 11 according to any one of the first to third embodiments of the present invention, preferably, the force measuring unit further measures a force acting on the driving unit, the first object 21, or the second object 22, and before the first object 21 and the second object 22 come into contact with each other at the three contact points, the first object 21 and the second object 22 are moved to a relative approximate position and approximate posture in advance so that the relative position and posture between the first object 21 and the second object 22 fall within a predetermined range of position and posture, on the basis of the force measured by the force measuring unit.

The operator may use the force measuring unit 31 to measure a force acting on the driving unit 50 or the first object 21 or the second object 22 to be moved by the driving unit 50, and move the driving unit 50 to guide it on the basis of the acting force to move the first object 21 and the second object 22 to an approximate relative position and posture which fall within a predetermined range of position and posture. The operator can thus operate the driving unit 50 to intuitively or directly move the object to be moved by the driving unit 50.

The operator may use the force measuring unit 31 to measure a force acting on the first object 21 or the second object 22 that is not moved by the driving unit 50, and move the driving unit 50 to guide it on the basis of the acting force to move the first object 21 and the second object 22 to an approximate relative position and posture which fall within a predetermined range of position and posture. Note that when another force sensor is located or another driving unit 50' holds the first object 21 or the second object 22 that is not moved by the driving unit 50 to enable detection of a force acting through the operator on the first object 21 or the second object 22 that is not moved by the driving unit 50, a force acting on the driving unit 50' is made measurable and calculable. Thus, the operator can easily move the first object 21 and the second object 22 relative to each other in a desired direction of relative movement, when viewed from the first object 21 or the second object 22 that is not moved by the driving unit 50.

When the force measuring unit 31 measures a force acting on the driving unit 50 or the object to be moved by the driving unit 50, the driving unit 50 is moved to and brought into contact with the object that is not moved by the driving unit 50 to calculate an approximate position and posture of the object that is not moved by the driving unit 50. The first object 21 and the second object 22 may be moved to an approximate relative position and posture which fall within a predetermined range of position and posture, on the basis of the calculated position and posture.

In this manner, even when the first object 21 and the second object 22 are coarsely moved to an approximate relative position and posture which fall within a predetermined range of position and posture, the relative position and/or posture between the first object 21 and the second object 22 can be calculated, as described in the first embodiment of the present invention. Thus, the first object 21 or the second object 22 to be moved by the driving unit 50 can be accurately moved to a desired position and/or posture, and a desired task can be appropriately executed, on the basis of the calculated relative position and/or posture.

In a sixth embodiment of the present invention, with respect to the object posture calculation system 11 according to any one of the first to third embodiments of the present invention, preferably, the object posture calculation system further includes an object detection unit 34 capable of detecting the position and/or posture of the first object 21 or the second object 22 within a predetermined range, wherein before the first object 21 and the second object 22 come into contact with each other at the three contact points, the first object 21 and the second object 22 are moved to a relative approximate position and approximate posture in advance so that the relative position and posture between the first object 21 and the second object 22 fall within a predetermined range of position and posture, on the basis of the detection result obtained by the object detection unit 34.

The object posture calculation system further includes an object detection unit 34 which can detect the position and/or posture of the first object 21 or the second object 22, or the projecting or recessed portion of the first object 21 or the second object 22 within a predetermined range, or can detect the position and/or posture of the object that is not moved by the driving unit 50, or the projecting or recessed portion of this object within a predetermined range, using a noncontact-type sensor which exploits, e.g., a camera, a laser, an LED, or ultrasound, or a contact-type sensor which detects a touch or a sense of force or touch, such as a force sensor, a torque sensor, a touch sensor, or a contact sensor. Assuming, for example, that the first object 21 is used as an object to be moved by the driving unit 50, when the shape of the first object 21 may be preferably recognized to a certain extent in moving the position and/or posture of the first object 21 relative to the second object 22 within a predetermined range due to, e.g., interference related to the complex shapes of the first object 21 and the second object 22, the position and/or posture of the object to be moved by the driving unit 50, i.e., the first object 21 may be detected within a predetermined range.

After the position and/or posture of the first object 21 or the second object 22 is detected by the object detection unit 34, the first object 21 and the second object 22 are moved to an approximate relative position and posture which fall within a predetermined range of position and posture, on the basis of the detection result.

In this manner, even when the first object 21 and the second object 22 are coarsely moved to an approximate relative position and posture which fall within a predetermined range of position and posture, the relative position and/or posture between the first object 21 and the second object 22 can be calculated, as described in the first embodiment of the present invention. Thus, the first object 21 or the second object 22 to be moved by the driving unit 50 can be accurately moved to a desired position and/or posture, and a desired task can be appropriately executed, on the basis of the calculated relative position and/or posture.

Since the object detection unit 34 can simply detect the position and/or posture of an object within a predetermined range, it suffices to implement the object detection unit 34 in, e.g., a sensor which can obtain minimum preferable information. This may involve, e.g., no sensor which can accurately detect the position and/or posture of an object and even reduce, e.g., sensor failures because of the use of no complex sensor. After the first object 21 and the second object 22 is moved to an approximate range of position and posture using a sensor which can hardly detect the position and/or posture of an object with high accuracy or can recognize only an approximate position and/or posture of an object, the relative position and posture between the first object 21 and the second object 22 can be more accurately calculated. This achieves a system highly stable in terms of system operation.

In a seventh embodiment of the present invention, with respect to the object posture calculation system 11 according to any one of the first to third embodiments of the present invention, preferably, the object posture calculation system further includes a spatial position designation unit 35 including a device which designates a position or a position and posture in a space, and a device which recognizes the designated position or position and posture, wherein before the first object 21 and the second object 22 come into contact with each other at the three contact points, the first object 21 and the second object 22 are moved to a relative approximate position and approximate posture in advance so that the relative position and posture between the first object 21 and the second object 22 fall within a predetermined range of position and posture, on the basis of the position or the position and posture designated by the spatial position designation unit 35.

The object posture calculation system preferably further includes a spatial position designation unit 35 which exploits, e.g., a camera, a laser, an LED, or ultrasound and includes a device which designates a position or a position and posture in a space, and a device which recognizes the designated position or position and posture. For example, the spatial position designation unit 35 may be configured to recognize by a camera, a marker set to enable designation of a position or a position and posture, or to irradiate a projecting or recessed portion at a position or a position and posture to be designated with a laser to form an image of a point or a cross or irradiate the projecting or recessed portion with an LED or ultrasound and receive the irradiation using a light-receiving device or a receiver.

The first object 21 and the second object 22 may be moved to an approximate relative position and posture which fall within a predetermined range of position and posture, on the basis of the recognition result obtained by recognizing the position or position and posture designated by the spatial position designation unit 35.

In this manner, even when the first object 21 and the second object 22 are coarsely moved to an approximate relative position and posture which fall within a predetermined range of position and posture, the relative position and/or posture between the first object 21 and the second object 22 can be calculated, as described in the first embodiment of the present invention. Thus, the first object 21 or the second object 22 to be moved by the driving unit 50 can be accurately moved to a desired position and/or posture, and a desired task can be appropriately executed, on the basis of the calculated relative position and/or posture.

In an eighth embodiment of the present invention, with respect to the object posture calculation system 11 according to any one of the first to seventh embodiments of the present invention, preferably, the position and/or posture of the first object 21 or the second object 22 with respect to the driving unit is calculated on the basis of the relative posture or the relative position and posture between the first object 21 and the second object 22 calculated by the object posture calculation unit.

The object posture calculation system preferably calculates the position and/or posture of the first object 21 or the second object 22 with respect to the driving unit 50 on the basis of the relative position and/or posture between the first object 21 and the second object 22 calculated by the object posture calculation unit 32. When the driving unit 50 moves the first object 21 including a projecting portion, a force measuring coordinate system CFa for posture calculation for the first object 21 is calculated, and when the force measuring coordinate system CFa for posture calculation is different in posture from a tool coordinate system, the tool coordinate system may be corrected. When the position of the projecting portion of the first object 21 held and moved by the driving unit 50 is known while the posture of the first object 21 is unknown, a force measuring coordinate system CFa for posture calculation for the first object 21 is calculated to obtain the posture of the first object 21. When the position of the projecting portion brought into contact with the recessed portion of the second object 22, in the first object 21 held and moved by the driving unit 50, is known while the accurate positions and/or postures of a plurality of different projecting portions located on the first object 21 are unknown and the position and posture of a coordinate system defining the position and posture of the first object 21 are unknown, i.e., when the posture of the first object 21 varies at a certain point set on the projecting portion of the first object 21 brought into contact with the recessed portion of the second object 22, the position and posture of the coordinate system defining the position and posture of the first object 21 may be obtained from the positions and/or postures of the plurality of different projecting portions located on the first object 21, obtained by bringing the plurality of different projecting portions located on the first object 21 into contact with the recessed portion of the second object 22, to, in turn, obtain the position and posture of the first object 21 with respect to the driving unit 50.

Since the position and/or posture of the first object 21 or the second object 22 with respect to the driving unit 50 can be determined by calculating the position and/or posture of the first object 21 or the second object 22 with respect to the driving unit 50, a desired task can be more appropriately, accurately executed.

In a ninth embodiment of the present invention, with respect to the object posture calculation system 11 according to any one of the first to eighth embodiments of the present invention, preferably, the position and/or posture to which the first object 21 and/or the second object 22 to be moved by the driving unit is moved is corrected on the basis of the relative posture or the relative position and posture between the first object 21 and the second object 22 calculated by the object posture calculation unit.

Tasks which use the first object 21 and the second object 22, e.g., assembly and processing tasks can be more appropriately, accurately executed by correcting the position and/or posture to which the first object 21 and/or the second object 22 to be moved by the driving unit 50 is moved, on the basis of the relative posture or the relative position and posture between the first object 21 and the second object 22 calculated by the object posture calculation unit 32.

When, as illustrated as FIG. 2, the object posture calculation system includes two driving units: a driving unit 50 which moves the first object 21 and a driving unit 50' which moves the second object 22, the position and posture relationship between the driving units 50 and 50' is known, the position and posture of the first object 21 with respect to the driving unit 50 are known, and the position and posture of the second object 22 with respect to the driving unit 50' are unknown, the relative position and posture between the first object 21 and the second object 22 can be calculated, as described in the first embodiment of the present invention. Thus, on the basis of the calculated relative position and posture, the position and posture of the second object 22 with respect to the driving unit 50' become known, so that the driving unit 50' can accurately move the second object 22 to a desired position and/or posture, and a desired task can be appropriately executed.

In a 10th embodiment of the present invention, with respect to the object posture calculation system 11 according to any one of the first to ninth embodiments of the present invention, preferably, at least one type of determination among quality determination of the first object 21 or the second object 22, type determination of the first object 21 or the second object 22, and determination of the holding state in which the first object 21 or the second object 22 is held by the driving unit 50 is performed on the basis of the relative posture or the relative position and posture between the first object 21 and the second object 22 calculated by the object posture calculation unit.

The relative position and/or posture between the first object 21 and the second object 22 can be calculated by bringing the first object 21 and the second object 22 into contact with each other at three contact points, as described in the first embodiment of the present invention. The positions of the three contact points for the first object 21 and the second object 22 can further be calculated. The posture or the position and posture of the object that is not moved by the driving unit 50 with respect to the driving unit 50 can even be calculated on the basis of the relative posture or the relative position and posture between the first object 21 and the second object 22. On the basis of these calculation results, various types of determination such as quality determination and type determination may be performed for the first object 21 or the second object 22, or the holding state of the object to be moved by the driving unit 50, i.e., the held first object 21 and/or second object 22 may be determined.

The quality determination of an object means herein determining the quality of an object, such as a workpiece or a tool, in terms of whether the object is the intended one. It is determined whether, for example, a workpiece, a tool, or the like as a target for determination is an object in a state different from an intended state, is a defective product, is an object of a type different from an intended type, or is a damaged workpiece.

The type determination of an object means determining the type of an object. The determination of the holding state of an object means determining, e.g., whether the distal end portion of the driving unit 50 and the held object maintain a predetermined posture relationship.

Quality determination may be performed such that in moving the first object 21 by the driving unit 50, when the position and/or posture of the second object 22 relative to the first object 21 falls within a predetermined range of position and/or posture, the second object 22 is determined to be an intended object, i.e., good; otherwise, the second object 22 is determined to be an unintended object, i.e., poor. Further, the holding state may be determined such that in moving the first object 21 by the driving unit 50, when the position and/or posture of the second object 22 relative to the first object 21 falls within a predetermined range of position and/or posture, the first object 21 is determined to be held in an intended state; otherwise, the first object 21 is determined to be held in an unintended state.

Type determination may be performed such that in moving the first object 21 by the driving unit 50, when the position and/or posture of the second object 22 relative to the first object 21 falls within a predetermined range of position and/or posture, the second object 22 is determined to be a specific type of object; otherwise, the second object 22 is determined to be a different type of object. In this case, type determination may be performed by finely determining the type of object in accordance with the predetermined range of position and/or posture.

Assuming that a projecting portion is located on the first object 21, when the driving unit 50 moves the first object 21, the projecting portion of the first object 21 is brought into contact with the recessed portion of the second object 22 to set a force measuring coordinate system for posture calculation for this projecting portion. On the basis of the difference between the posture of the force measuring coordinate system for posture calculation after the completion of setting at this time and the posture of a tool coordinate system set for the projecting portion of the first object 21, the holding state is determined in terms of, e.g., whether the first object 21 has been set at a desired posture, a nearly desired posture, or an unintended posture with respect to the driving unit 50. It may be determined whether the first object 21 is obtained and held at an undesired posture, the type of first object 21 held may further be determined, or it may even be determined whether the held object is an object such as an intended tool or workpiece, on the basis of the relative posture between the force measuring coordinate system for posture calculation after the completion of setting and the tool coordinate system set for the projecting portion of the first object 21.

Various types of determination such as quality determination as to whether the first object 21 or the second object 22 is an intended object, type determination for determining the type of object for the first object 21 or the second object 22, or holding state determination for determining whether, for example, the held object has been set at a desired posture or a nearly desired posture or the type of held object or the held object is an intended object may be performed on the basis of the positions of the three contact points for the first object 21 or the second object 22.

A plurality of determination operations may be performed at once to perform at least one type of determination among the above-mentioned quality determination, type determination, and holding state determination. In this case, the accuracy of various types of determination can be improved by combining a plurality of determination operations.

When a plurality of projecting portions or recessed portions are located on the first object 21 or the second object 22, quality determination and type determination of the object including the plurality of projecting portions or recessed portions may be performed on the basis of the calculated relative positions and/or postures between the plurality of projecting portions or recessed portions. Quality determination and type determination of the object including the plurality of projecting portions or recessed portions may further be performed on the basis of the known position and/or posture relationships between the plurality of projecting portions or recessed portions, and the calculated relative positions and/or postures between the plurality of projecting portions or recessed portions.

In an 11th embodiment of the present invention, with respect to the object posture calculation system 11 according to any one of the first to 10th embodiments of the present invention, preferably, the projecting portion and the recessed portion can be fitted together in a combination of the projecting portion and the recessed portion in the first object 21 and the second object 22, the driving unit moves the first object 21 and the second object 22 relative to each other, holds and moves at least one of the first object 21 and the second object 22, and is capable of movement to fit the first object 21 and the second object 22 together, the object posture calculation system further includes a fitting unit 36 which uses the driving unit to move the first object 21 and the second object 22 relative to each other to perform force control to fit the first object 21 and the second object 22 together, on the basis of the force measured by the force measuring unit, and the fitting unit 36 fits the first object 21 and the second object 22 together on the basis of the relative posture or the relative position and posture between the first object 21 and the second object 22 calculated by the object posture calculation unit. The fitting unit 36 is mounted in the driving unit controller 52 and may be included in, e.g., a central controller, another controller, or an arithmetic processor connected to the driving unit controller 52, like the object posture calculation unit 32, as described earlier.

The projecting portion of the first object 21 and the recessed portion of the second object 22 or the recessed portion of the first object 21 and the projecting portion of the second object 22 satisfy predetermined conditions, as described in the first embodiment of the present invention, and serve as fittable objects as described in the first embodiment of the present invention. Further, the fittable projecting or recessed portion may be removably attached to the first object 21 or the second object 22 including the projecting or recessed portion. As described in the first embodiment of the present invention, the driving unit 50 can move the first object 21 and the second object 22 to fit them together, like a vertical multi-articulated robot which uses six axes. The object posture calculation system 11 preferably further includes a fitting unit 36 which uses the driving unit 50 to move the first object 21 and the second object 22 relative to each other to perform force control to fit the first object 21 and the second object 22 together, on the basis of the force measured by the force measuring unit 31.

The fitting unit 36 achieves reliable fitting between the first object 21 and the second object 22 in a short period of time even when their relative posture is large by using the relative posture or the relative position and posture between the first object 21 and the second object 22 calculated by the object posture calculation unit 32. When the relative posture between the first object 21 and the second object 22 is large, it is often difficult to fit the first object 21 and the second object 22 together by force control. The first object 21 and the second object 22 can be reliably fitted together in a short period of time by performing fitting using force control after movement to reduce the relative posture in advance or performing fitting under force control based on the calculated relative posture or relative position and posture, in accordance with the present invention.

In a 12th embodiment of the present invention, with respect to the object posture calculation system 11 according to the 11th embodiment of the present invention, preferably, the fitting unit 36 fits the first object 21 and the second object 22 together after movement to correct the relative posture or the relative position and posture between the first object 21 and the second object 22, on the basis of the relative posture or the relative position and posture between the first object 21 and the second object 22 calculated by the object posture calculation unit.

When the relative posture between the first object 21 and the second object 22 is large, the first object 21 and the second object 22 can be reliably fitted together in a short period of time by performing a fitting operation after movement to reduce the relative posture in advance.

In a 13th embodiment of the present invention, with respect to the object posture calculation system 11 according to the 11th embodiment of the present invention, preferably, the fitting unit 36 fits the first object 21 and the second object 22 together by performing force control based on the force measured by the force measuring unit to increase the velocity of movement for reducing the relative posture between the first object 21 and the second object 22 when the relative posture between the first object 21 and the second object 22 is large, on the basis of the relative posture or the relative position and posture between the first object 21 and the second object 22 calculated by the object posture calculation unit.

In fitting the first object 21 and the second object 22 together by force control, when the relative posture between the first object 21 and the second object 22 is large, i.e., when the first object 21 and the second object 22 are moved relative to each other by a predetermined angle based on the relative posture in the direction to reduce the relative posture by using a relative posture calculated in advance, the velocity is controlled by, e.g., reducing the gain of force control, reducing the amount of movement command according to the force, and increasing the rotational velocity command added to the amount of movement command to increase the rotation velocity. This allows coarse, rapid movement until the relative posture is expected to become small.

After the first object 21 and the second object 22 are moved relative to each other by a predetermined angle based on the value of the relative posture in the direction to reduce the relative posture, the velocity is controlled by, e.g., increasing the gain of force control, increasing the amount of movement command according to the force, and reducing the rotation velocity command added to the amount of movement command. This allows a precise motion by fine movement according to the force when the relative posture is expected to be small.

As the relative posture between the first object 21 and the second object 22 is changed, coarse, rapid movement is performed until the projecting portion central axis La of the first object 21 illustrated as FIGS. 11a to 11c approximately coincides with the central axis of the hole of the recessed portion of the second object 22, i.e., when the minimum distance between the projecting portion central axis La and the point Ob is larger than a predetermined value, and a precise motion is made by fine movement according to the force when the minimum distance between the projecting portion central axis La and the point Ob reduces to the predetermined value or less, on the basis of the relative position between the first object 21 and the second object 22 calculated in advance. In this manner, for the direction of translation as well, the operation of force control is preferably changed according to the circumstances involved by performing coarse, rapid movement until the relative position is expected to become small for the X- and Y-axis directions of the coordinate system CFb set for the second object 22, and making a precise motion by fine movement according to the force when the relative position is expected to be small.

Changing the operation of force control according to the circumstances involved, as described earlier, achieves reliable fitting between the first object 21 and the second object 22 in a short period of time.

According to the present invention, since the relative posture between the first object and the second object is calculated on the basis of the force acting between the first object and the second object when the first object and the second object are in contact with each other at three contact points, the relative posture between the first object and the second object can be easily calculated by bringing the first object and the second object into contact with each other.

Thus, according to the present invention, it suffices for the system to bring the first object and the second object into contact with each other at three contact points to measure and calculate a force acting between the first object and the second object, and a noncontact-type sensor such as a camera or a three-dimensional sensor which can accurately detect the position and posture of an object may not be used, thus simplifying the system and keeping the cost low. The first object and the second object may be undetectable or hard to detect using a noncontact-type sensor such as a camera or a three-dimensional sensor, depending on, e.g., the surface conditions. The present invention is also applicable to the situations in which the first object and the second object may not be detected using a noncontact-type sensor such as a camera or a three-dimensional sensor due to problems such as interference related to the system conditions.

Further, according to the present invention, no operation for fitting the first object with the second object may be performed to calculate the relative posture between the first object and the second object. Since no time may be consumed for the fitting operation, the cycle time of the system can be shortened. The relative position and posture can be calculated regardless of success or failure of the fitting operation. The first object and the second object may not be fittable objects. The relative posture between the first object and the second object can be calculated when this relative posture is large.

Again according to the present invention, no operation for combining the surface of the first object with that of the second object may be performed to calculate the relative posture between the first object and the second object. Since no time may be consumed for the surface combining operation, the cycle time of the system can be shortened. The relative position and posture can be calculated regardless of success or failure of the surface combining operation. The first object and the second object may not be objects having combinable surfaces.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An object posture calculation system which calculates a relative posture between a first object and a second object or calculates a relative position and posture between the first object and the second object, the system comprising:
   the first object and the second object comprising a combination of an object comprising a projecting portion and an object comprising a recessed portion, wherein the projecting portion and the recessed portion are configured to come into contact with each other at three contact points, the three contact points in the recessed portion are located on an edge defining a hole of the recessed portion, and upon defining, as a projecting portion central axis, an axis which is set for the projecting portion and is not perpendicular to a plane comprising the three contact points, a minimum distance between each of the contact points and the projecting portion central axis takes a constant value or a minimum distance between each of the contact points and the projecting portion central axis is determined on the basis of a distance between a point of intersection of a perpendicular dropped from each of the contact points to the projecting portion central axis with the projecting portion central axis, and a point other than the point of intersection on the projecting portion central axis;
   at least one driving unit which moves the first object and the second object relative to each other and holds and drives at least one of the first object and the second object;
   a force measuring unit which measures a force acting between the first object and the second object; and
   an object posture calculation unit which uses the driving unit to move the first object and the second object relative to each other to bring the first object and the second object into contact with each other, and calculates a relative posture between the first object and the second object or calculates a relative position and posture between the first object and the second object on the basis of the minimum distance and the force measured by the force measuring unit when the first object and the second object come into contact with each other at the three contact points.

2. The object posture calculation system according to claim 1, wherein
   the projecting portion comprises at least two projecting portions and the recessed portion comprises at least two recessed portions, and
   the first object comprises one of the at least two projecting portions and the at least two recessed portions,
   the second object comprises one of the at least two projecting portions and the at least two recessed portions, or
   each of the first object and the second object comprises one of the at least two projecting portions and the at least two recessed portions.

3. The object posture calculation system according to claim 1, wherein at least one object selected from the projecting portion and the recessed portion and comprised in one of the first object and the second object is removably attached to the one of the first object and the second object comprising the at least one object.

4. The object posture calculation system according to claim 1, wherein before the first object and the second object come into contact with each other at the three contact points, the first object and the second object are moved to a relative approximate position and approximate posture in advance so that the relative position and posture between the first object and the second object fall within a predetermined range of position and posture.

5. The object posture calculation system according to claim 1, wherein
   the force measuring unit further measures a force acting on one of the driving unit, the first object, and the second object, and
   before the first object and the second object come into contact with each other at the three contact points, the first object and the second object are moved to a relative approximate position and approximate posture in advance so that the relative position and posture between the first object and the second object fall within a predetermined range of position and posture, on the basis of the force measured by the force measuring unit.

6. The object posture calculation system according to claim 1, further comprising:
   an object detection unit configured to detect at least one of a position and a posture of one of the first object and the second object within a predetermined range,
   wherein before the first object and the second object come into contact with each other at the three contact points, the first object and the second object are moved to a relative approximate position and approximate posture in advance so that the relative position and posture between the first object and the second object fall within a predetermined range of position and posture, on the basis of a detection result obtained by the object detection unit.

7. The object posture calculation system according to claim 1, further comprising:
a spatial position designation unit comprising a device which designates one of a position and a position and posture in a space, and a device which recognizes the designated one of the position and the position and posture,
wherein before the first object and the second object come into contact with each other at the three contact points, the first object and the second object are moved to a relative approximate position and approximate posture in advance so that the relative position and posture between the first object and the second object fall within a predetermined range of position and posture, on the basis of the one of the position and the position and posture designated by the spatial position designation unit.

8. The object posture calculation system according to claim 1, wherein at least one of a position and a posture of one of the first object and the second object with respect to the driving unit is calculated on the basis of one of the relative posture and the relative position and posture between the first object and the second object calculated by the object posture calculation unit.

9. The object posture calculation system according to claim 1, wherein one of a position, a posture, and a position and posture to which one of the first object, the second object, and the first object and the second object to be moved by the driving unit is moved is corrected on the basis of one of the relative posture and the relative position and posture between the first object and the second object calculated by the object posture calculation unit.

10. The object posture calculation system according to claim 1, wherein at least one type of determination among quality determination of one of the first object and the second object, type determination of one of the first object and the second object, and determination of a holding state in which one of the first object and the second object is held by the driving unit is performed on the basis of one of the relative posture and the relative position and posture between the first object and the second object calculated by the object posture calculation unit.

11. The object posture calculation system according to claim 1, wherein
the projecting portion and the recessed portion are configured to be fitted together in a combination of the projecting portion and the recessed portion in the first object and the second object,
the driving unit moves the first object and the second object relative to each other, holds and moves at least one of the first object and the second object, and is configured to perform movement to fit the first object and the second object together,
the object posture calculation system further comprises a fitting unit which uses the driving unit to move the first object and the second object relative to each other to perform force control to fit the first object and the second object together, on the basis of the force measured by the force measuring unit, and
the fitting unit fits the first object and the second object together on the basis of one of the relative posture and the relative position and posture between the first object and the second object calculated by the object posture calculation unit.

12. The object posture calculation system according to claim 11, wherein the fitting unit fits the first object and the second object together after movement to correct one of the relative posture and the relative position and posture between the first object and the second object, on the basis of one of the relative posture and the relative position and posture between the first object and the second object calculated by the object posture calculation unit.

13. The object posture calculation system according to claim 11, wherein the fitting unit fits the first object and the second object together by performing force control based on the force measured by the force measuring unit to increase a velocity of movement for reducing the relative posture between the first object and the second object when the relative posture between the first object and the second object is large, on the basis of one of the relative posture and the relative position and posture between the first object and the second object calculated by the object posture calculation unit.

* * * * *